United States Patent [19]
Nakamura

[11] Patent Number: 5,671,062
[45] Date of Patent: Sep. 23, 1997

[54] ZOOM LENS HAVING A LIGHT WEIGHT AND TEMPERATURE INDEPENDENT FOURTH LENS GROUP

[75] Inventor: Akira Nakamura, Tokyo, Japan

[73] Assignee: Sony Corporation, Japan

[21] Appl. No.: 538,376

[22] Filed: Oct. 11, 1994

Related U.S. Application Data

[63] Continuation of Ser. No. 883,215, May 14, 1992, abandoned.

[30] Foreign Application Priority Data

May 21, 1991 [JP] Japan ..................... 3-116150

[51] Int. Cl.$^6$ ..................................... G02B 15/14
[52] U.S. Cl. ..................... 359/687; 359/676; 359/686
[58] Field of Search ........................... 359/684, 687, 359/686, 676

[56] References Cited

U.S. PATENT DOCUMENTS

| | | | |
|---|---|---|---|
| 4,557,567 | 12/1985 | Azumi et al. | 359/683 |
| 4,653,872 | 3/1987 | Takahashi | 359/687 |
| 4,659,187 | 4/1987 | Tsuji et al. | 359/688 |
| 4,818,083 | 4/1989 | Mihara | 359/687 |
| 4,859,042 | 8/1989 | Tanaka | 359/687 X |
| 5,009,492 | 4/1991 | Hamano | 359/687 X |

FOREIGN PATENT DOCUMENTS

| | | |
|---|---|---|
| 62-24213 | 2/1987 | Japan . |
| 63-123009 | 5/1988 | Japan . |

Primary Examiner—Hung X. Dang
Attorney, Agent, or Firm—Ronald P. Kananen

[57] ABSTRACT

A rear-focus, four-lens-group zoom lens has a first lens group having a positive refracting power, a second lens group having a negative refracting power, a third lens group having a positive refracting power, and a fourth lens group having a positive refracting power. The first, second, third, and fourth lens groups are successively arranged in the order named from an object side. The first and third lens groups are fixed in position. The second lens group is movable for varying magnification and the fourth lens group is movable for compensating for an image plane movement due to the varied magnification and also for focusing. The fourth lens group comprises a negative-meniscus lens having a convex surface directed toward the object side and a positive lens, the negative-meniscus lens and the positive lens being successively arranged in the order named from the object side. The negative-meniscus lens and the positive lens can be either joined to or separated from each other, at least one of the negative-meniscus lens and the positive lens being made of an organic material.

9 Claims, 25 Drawing Sheets

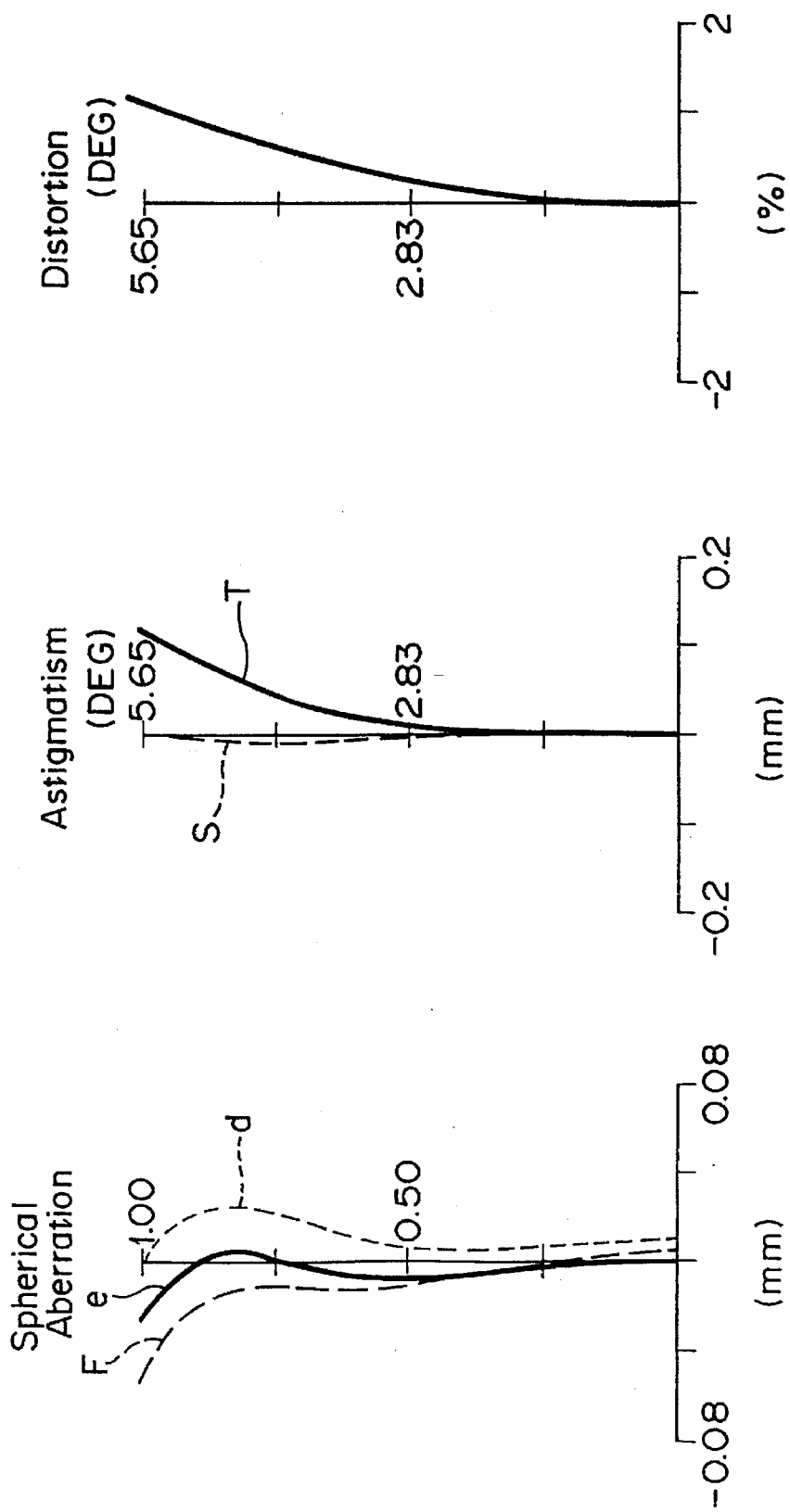

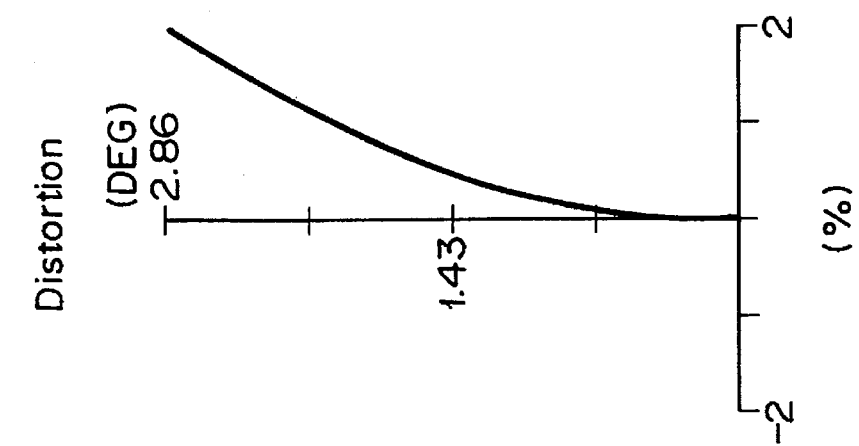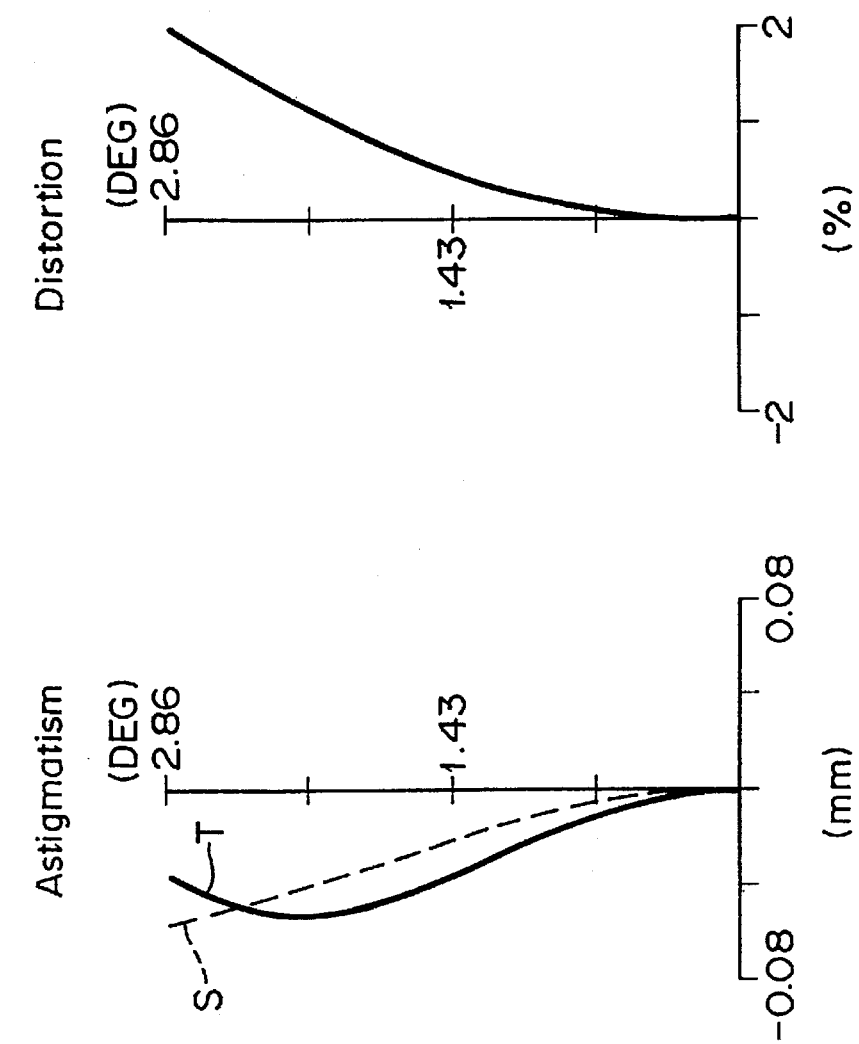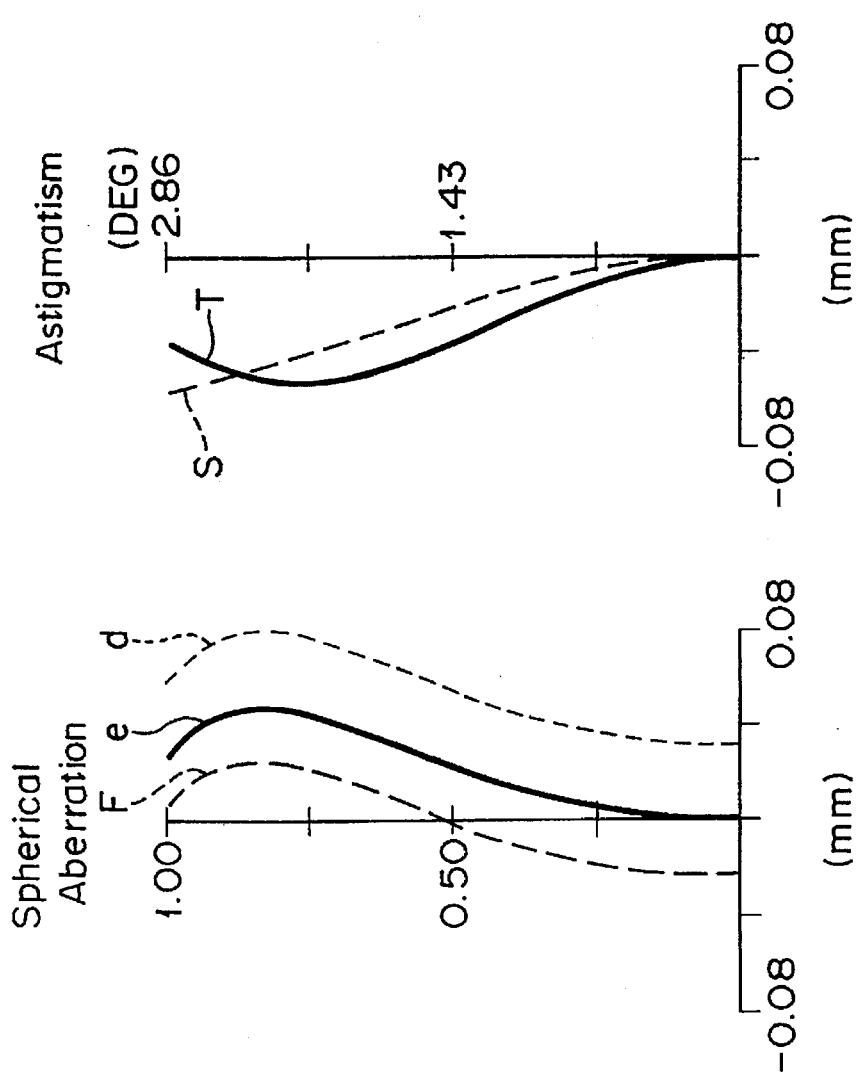

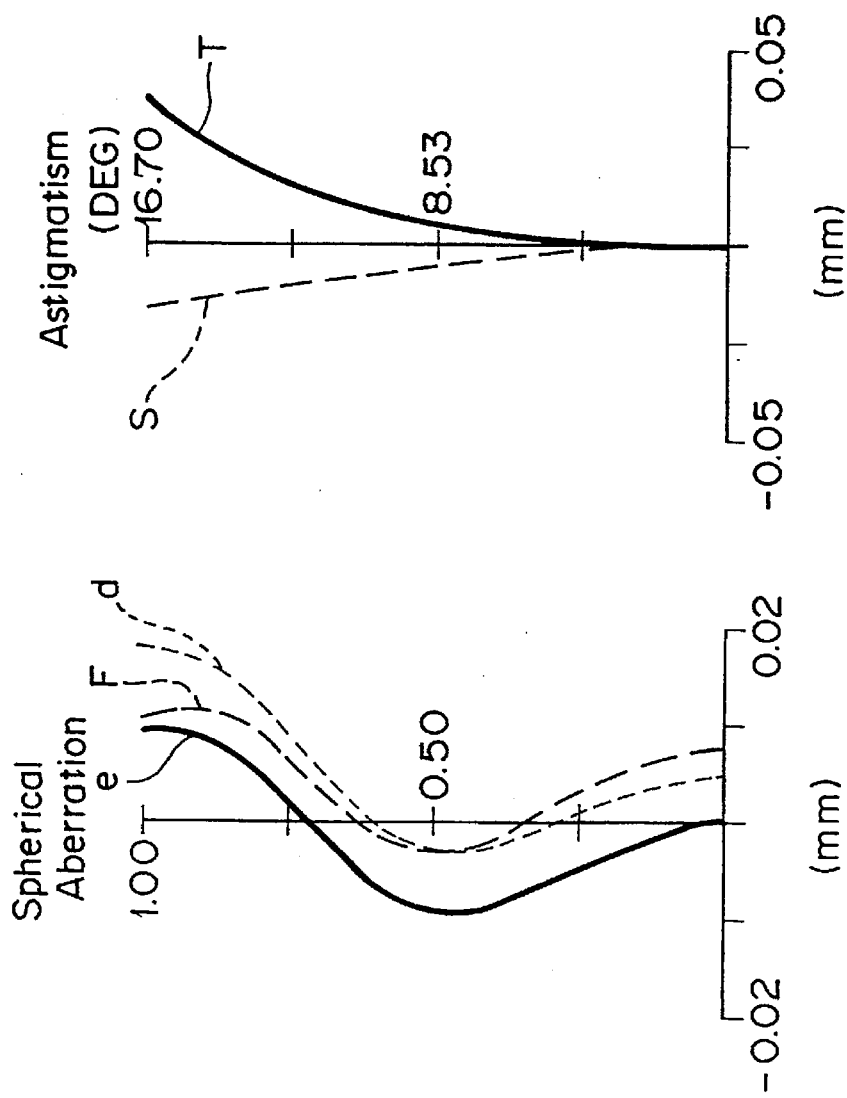

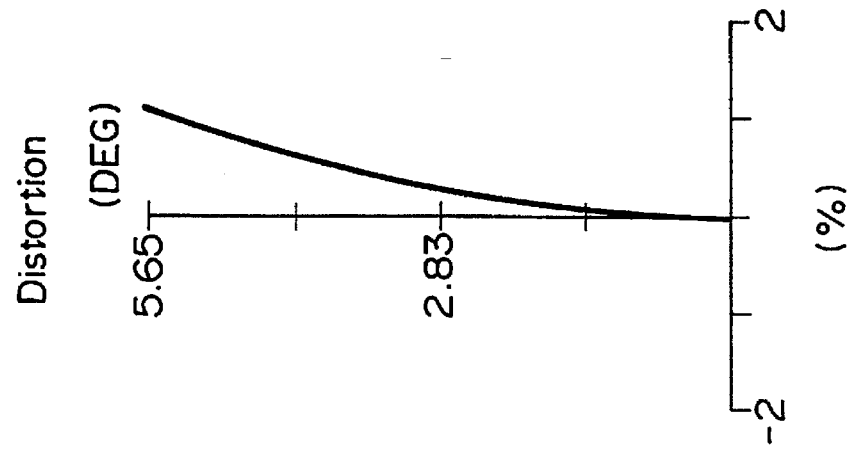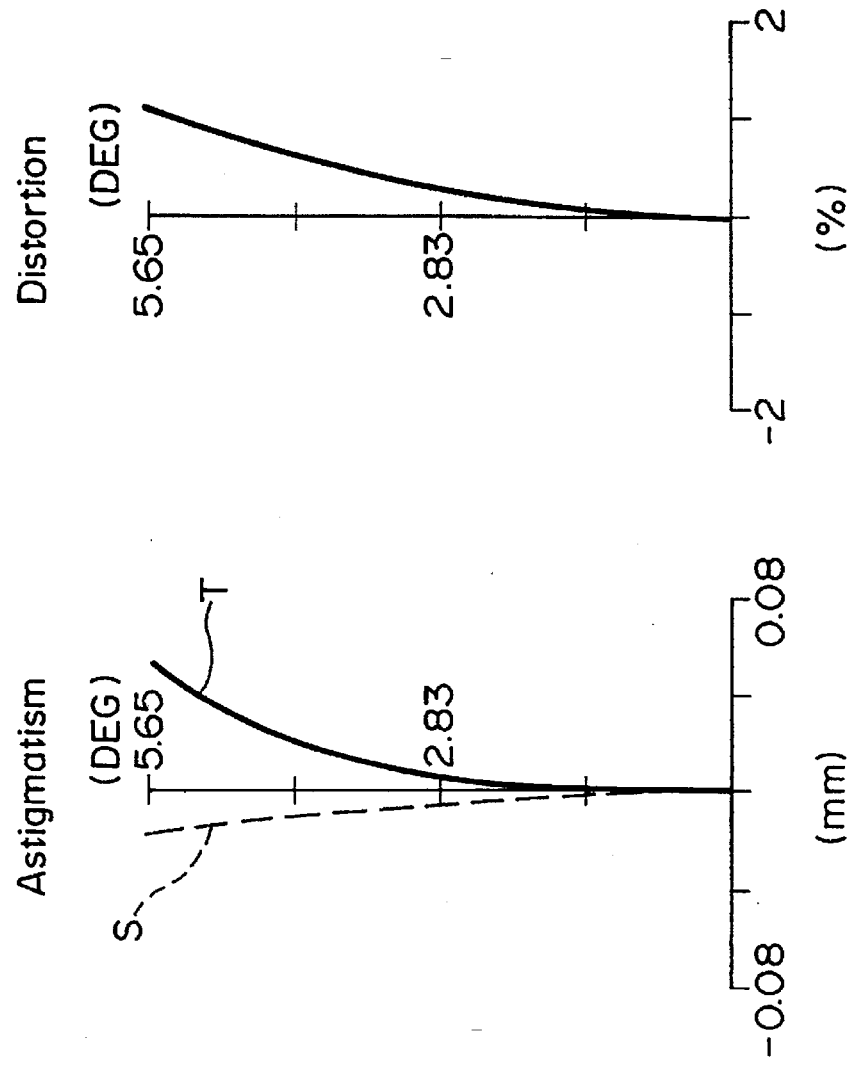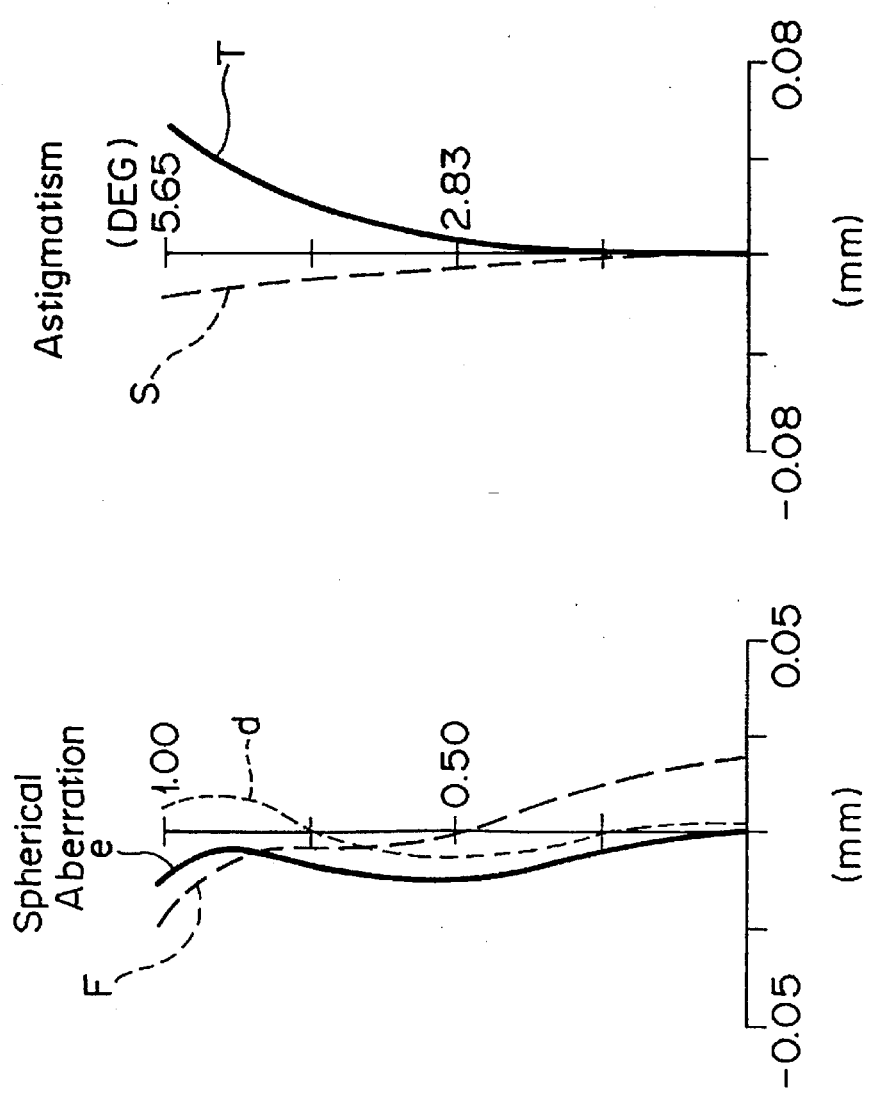

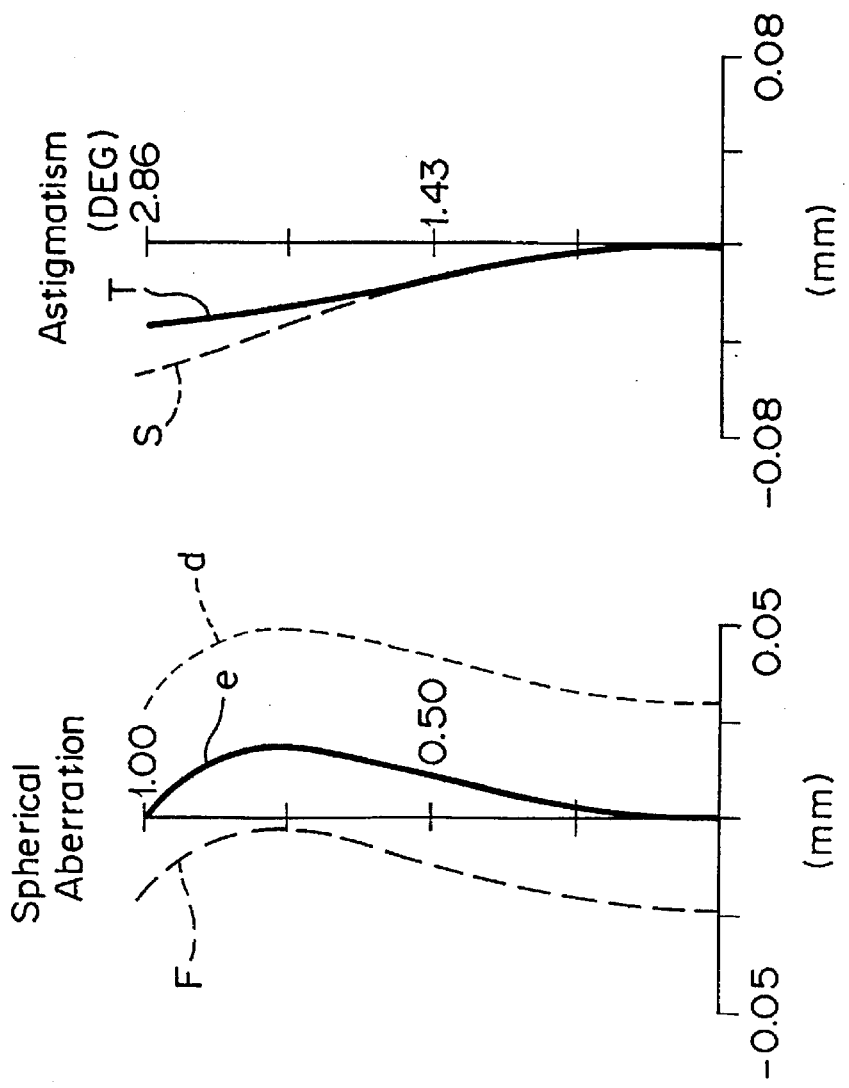

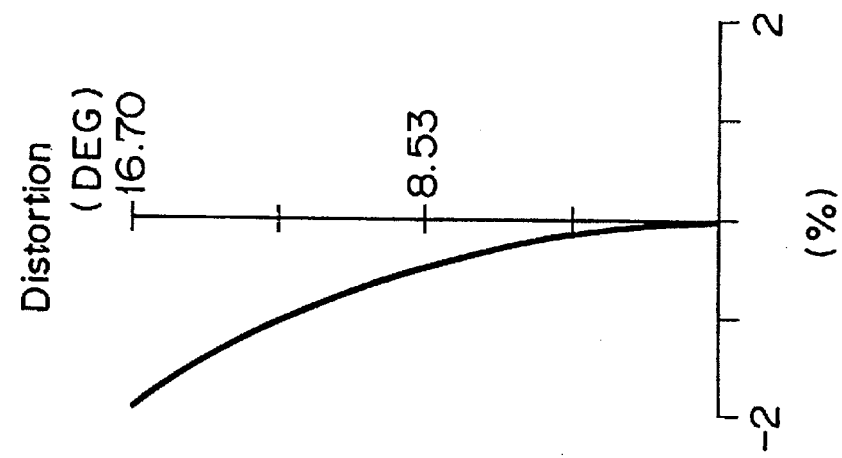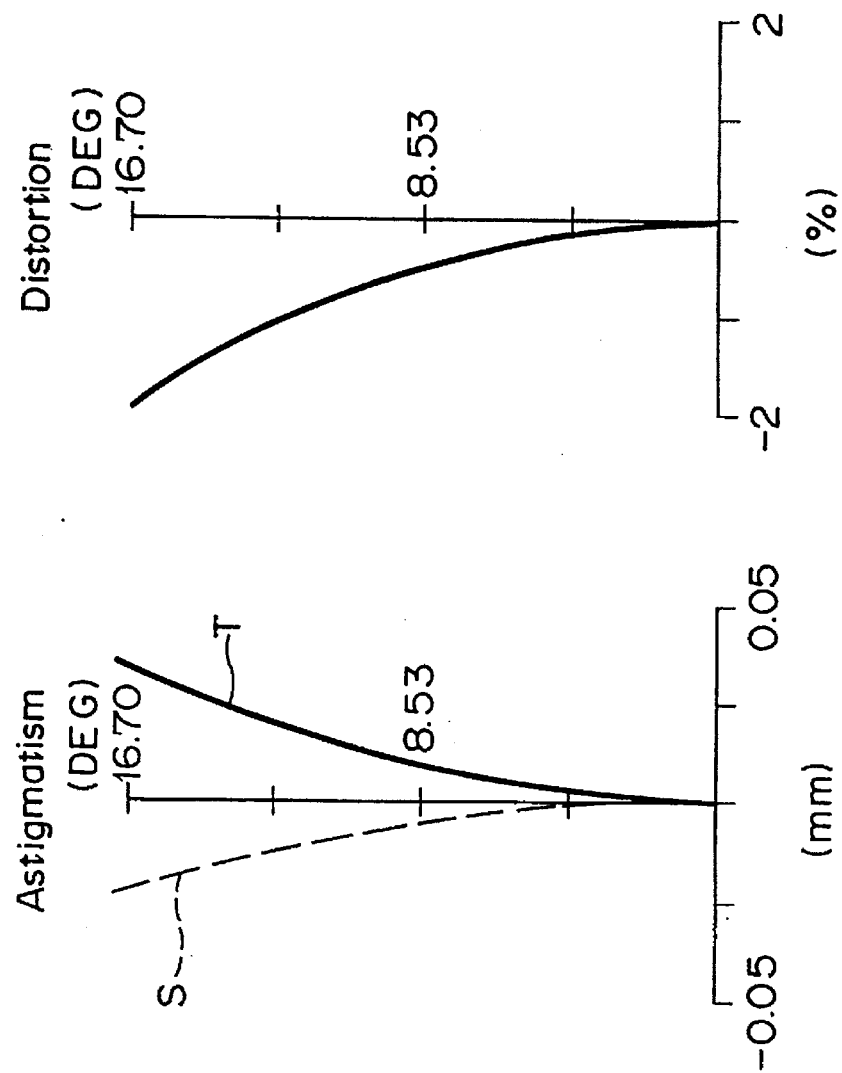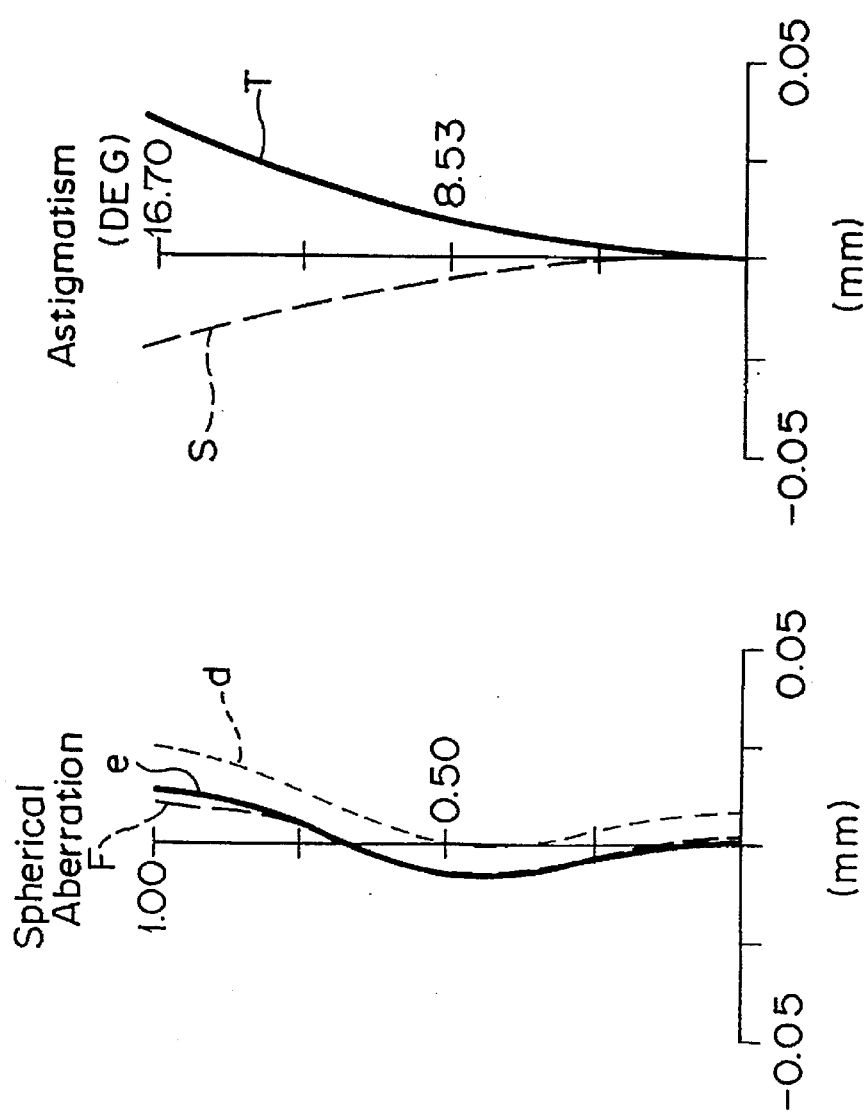

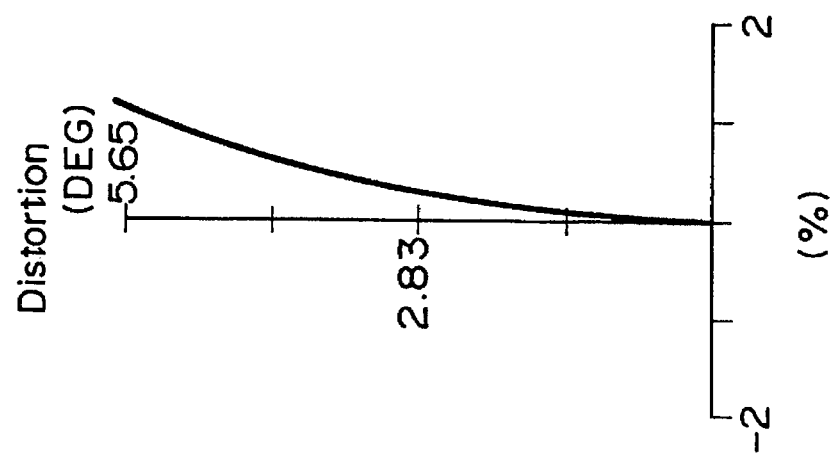
FIG. 24A
FIG. 24B
FIG. 24C
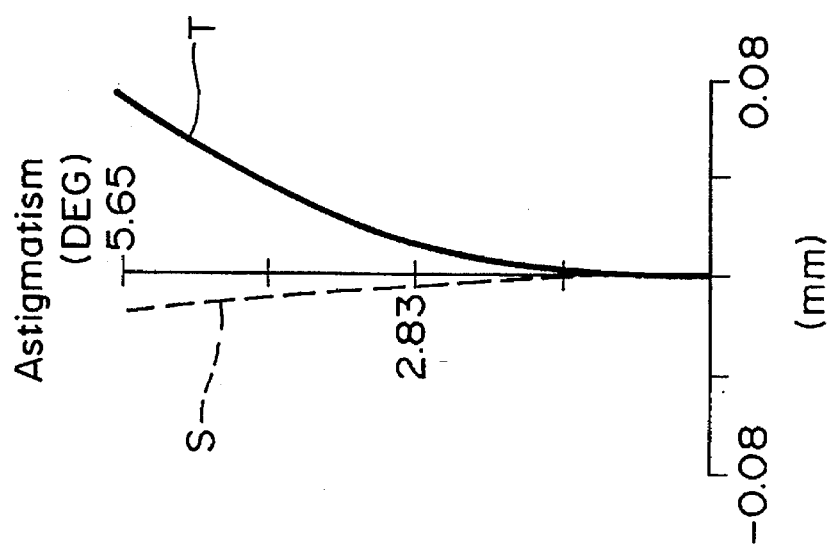
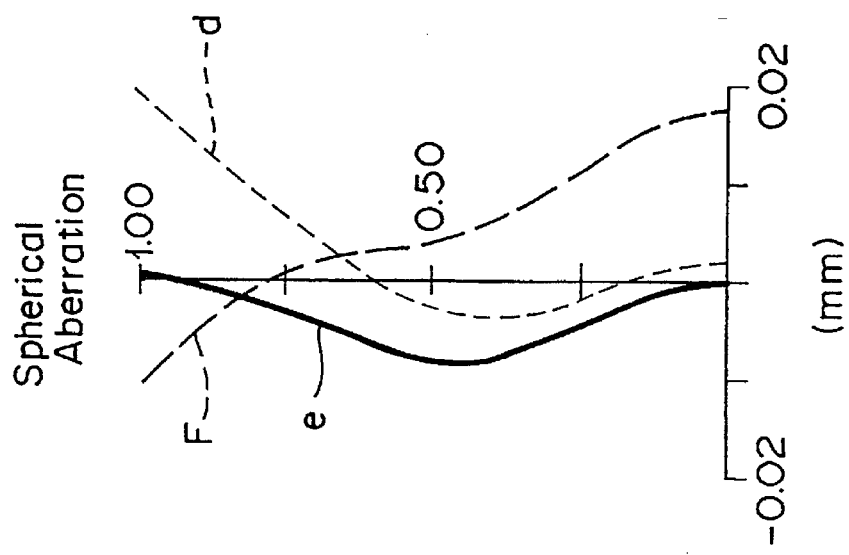

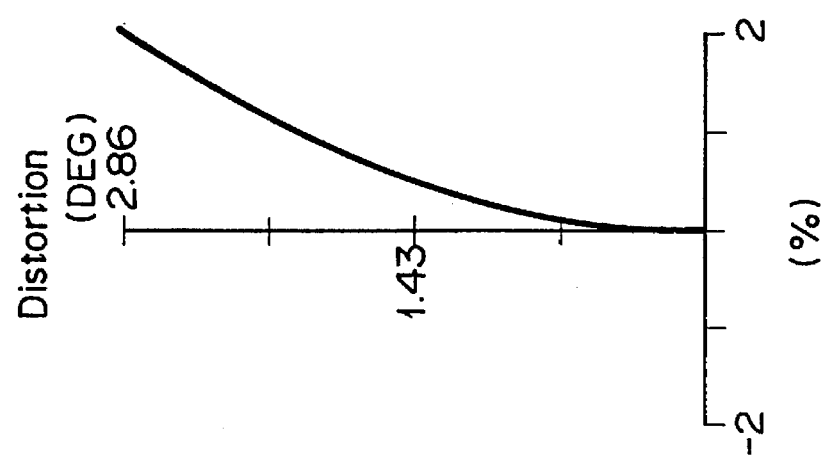
FIG. 25C
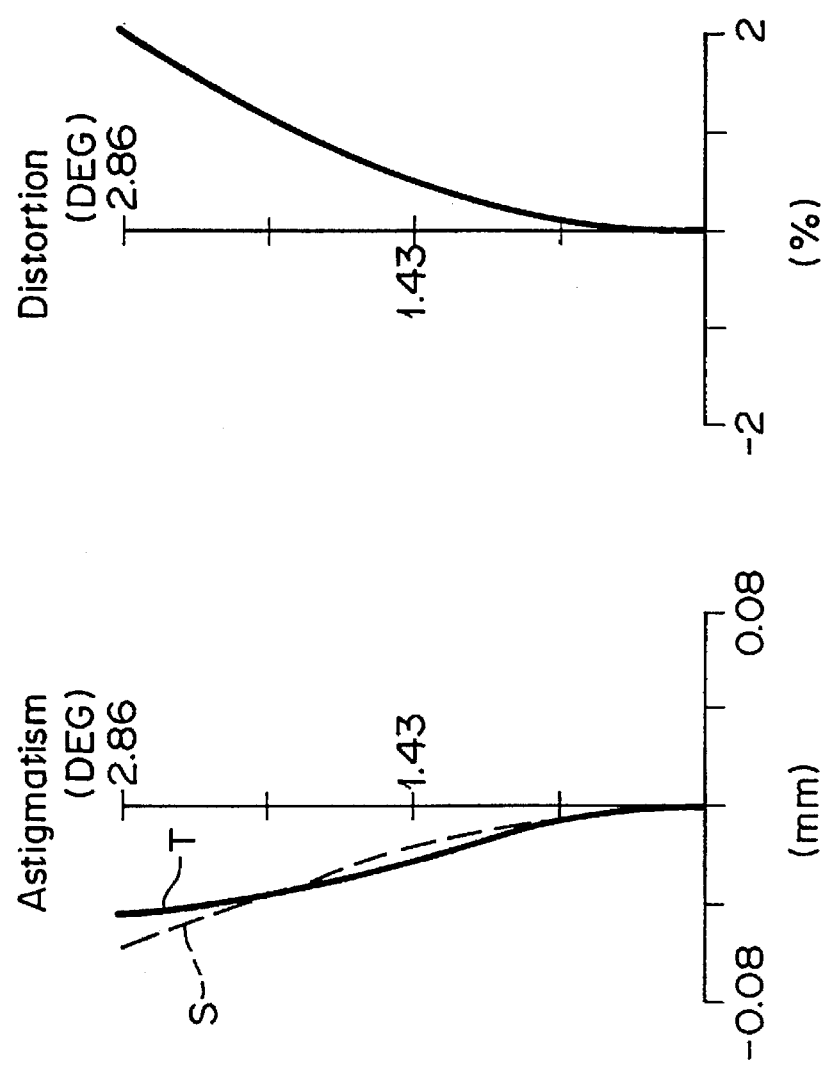
FIG. 25B
FIG. 25A
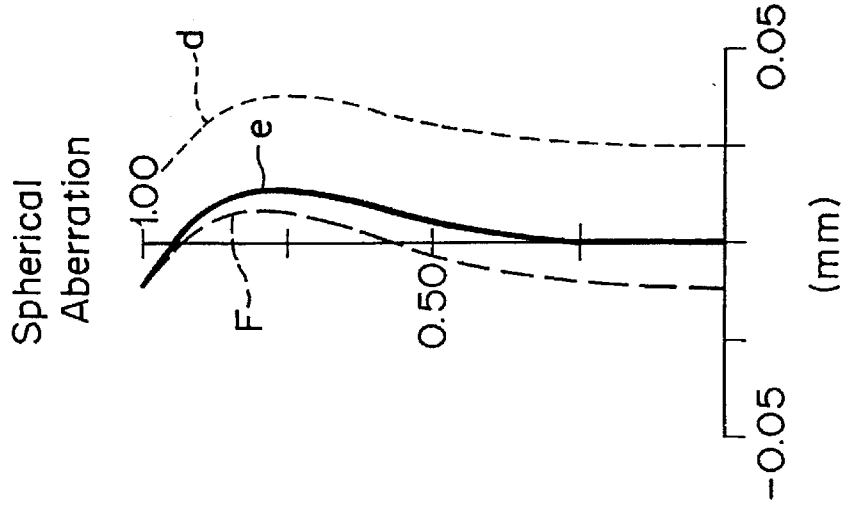

ZOOM LENS HAVING A LIGHT WEIGHT AND TEMPERATURE INDEPENDENT FOURTH LENS GROUP

This application is a continuation of application Ser. No. 07/883,215 filed May 4, 1992, now abandoned.

BACKGROUND OF THE INVENTION

1. Field of the Invention

The present invention relates to a zoom lens, and more particularly to a rear-focus zoom lens of high variable magnification capability suitable for use on a still camera or a video camera.

2. Description of the Prior Art

One known zoom lens for use on a still camera or a video camera comprises positive, negative, positive, and positive lens groups. The first lens group serves to focus images, the second lens group to vary the magnification, and the third lens group to compensate for an image plane movement caused when the magnification varies. However, such a front-focus zoom lens with three movable lens groups requires a mechanical cam structure and is complex in as an overall zoom lens system structure. Furthermore, care should be exercised with respect to off-axis rays when focusing images, making it difficult to taking close-up pictures.

In view of the above drawbacks of a front-focus zoom lens with three movable lens groups, recent years have seen more and more rear-focus zoom lenses with two movable lens groups. Such rear-focus zoom lenses with two movable lens groups are disclosed in Japanese laid-open patent publications Nos. 62-24213 and 63-123009, for example. Each of the disclosed rear-focus zoom lenses is composed of positive, negative, positive, and positive lens groups. More specifically, the zoom lens comprises, successively arranged in the order named from an object side, a first lens group having a positive refracting power, a second lens group having a negative refracting power, a third lens group having a positive refracting power, and a fourth lens group having a positive refracting power. The first and third lens groups are fixed in position in a lens barrel, the second lens group is movable for varying the magnification, and the fourth lens is movable to compensate for an image plane movement caused when the magnification varies and also to focus images. The disclosed lens structure is effective not only to eliminate the above drawbacks, but also to reduce the size and weight of the lens group for focusing.

Now, the reduction in the weight of the fourth lens group will be reviewed from the standpoint of both focusing images and compensating for an image plane movement caused when the magnification varies. In recent years, great advances have been made in automatic and electronic control of zoom lens systems. There is also a demand for speeding up the varying of the magnification to achieve a high-speed automatic focusing capability while at the same time maintaining the desired optical performance. In addition, efforts should be made to reduce the size of zoom lens systems and also to lessen any load applied to actuators for the movable lens groups, so that the entire zoom lens system including the actuators will be reduced in size. Reducing the load on the actuators for the movable lens groups also means reducing the power consumption to reduce the size and weight of the battery used in combination with the actuators. To reduce the size and weight of the battery is highly advantageous in that the overall zoom lens system including an electronic circuit can also be reduced in size and weight. Therefore, the reduction in the weight of the fourth lens group which focuses images and compensates for an image plane movement caused when the magnification varies, is greatly effective in reducing the size and weight of the overall zoom lens system, and also to increase the speed of response for high-speed automatic focusing.

While many advantageous can be achieved by the reduction in the size and weight of the fourth lens group, since the lenses of the fourth lens group of the conventional four-group rear-focus zoom lenses are made of optical glass, there have been available no zoom lens systems with light-weight fourth lens groups.

OBJECTS AND SUMMARY OF THE INVENTION

In view of the foregoing shortcomings of the conventional zoom lenses, it is an object of the present invention to provide a four-group rear-focus zoom lens including a fourth lens group that is small in size and weight.

According to the present invention, there is provided a zoom lens comprising a first lens group having a positive refracting power, a second lens group having a negative refracting power, a third lens group having a positive refracting power, and a fourth lens group having a positive refracting power, the first, second, third, and fourth lens groups being successively arranged in the order named from an object side, the first and third lens groups being fixed in position, the second lens group being movable for varying magnification, the fourth lens group being movable for compensating for an image plane movement due to the varied magnification and also for focusing. The fourth lens group comprises a negative-meniscus lens having a convex surface directed toward the object side and a positive lens, the negative-meniscus lens and the positive lens being successively arranged in the order named from the object side, the negative-meniscus lens and the positive lens being joined to or separated from each other, at least one of the negative-meniscus lens and the positive lens being made of an organic material.

Both of the negative-meniscus lens and the positive lens are made of respective organic materials, the organic materials having a temperature parameter VT defined by:

$$vT = \left( \frac{\frac{dNd}{dT}}{Nd-1} - \alpha \right)^{-1}$$

where Nd is a refractive index with respect to the d-lines, dNd/dT is a temperature gradient of the refractive index, and α is a coefficient of linear expansion, the absolute value of the temperature parameter of the organic material of which the negative-meniscus lens is made being smaller than the absolute value of the temperature parameter of the organic material of which the positive lens is made.

Specifically, the negative-meniscus lens and the positive lens are separated from each other. They may be made of polycarbonate and polymethylmethacrylate, respectively, or polycarbonate and optical glass, respectively, or optical glass and polymethylmethacrylate, respectively.

Alternatively, the negative-meniscus lens and the positive lens are joined to each other. They may be made of polycarbonate and polymethylmethacrylate, respectively, or polycarbonate and optical glass, respectively, or optical glass and polymethylmethacrylate, respectively.

The negative-meniscus lens and the positive lens of the fourth lens group are capable of correcting for aberrations such as a chromatic aberration. The negative-meniscus lens and the positive lens which are combined together are of a combined shape close to a single positive lens, and hence are relatively small in size while maintaining their optical characteristics. The fourth lens group and the overall zoom lens are relatively light in weight as at least one of the lenses of the fourth lens group is made of an organic material.

Organic materials have poorer temperature characteristics than optical glasses. The focal length of the fourth lens group tends to vary due to a temperature change. Since the fourth lens group is movable when the magnification varies and also when focusing is effected, such a temperature-dependent change in the focal length of the fourth lens group can be canceled out when the fourth lens group is moved.

The sum of quotients produced when the powers of the respective lens surfaces (the reciprocals of the focal lengths thereof) are divided by corresponding temperature parameters represents the temperature characteristics of the focal length of the overall zoom lens. Since the fourth lens group has a positive refracting power as a whole, the absolute value of the power of the negative-meniscus lens thereof is smaller than that of the power of the positive lens. By selecting the materials of the lenses of the fourth lens group such that the absolute value of the temperature parameter of the negative-meniscus lens is smaller than the absolute value of the temperature parameter of the positive lens, the temperature-dependent rate of change of the focal length of the fourth lens group is rendered relatively small.

The above and other objects, features, and advantages of the present invention will become apparent from the following description of an illustrative embodiment thereof to be read in conjunction with the accompanying drawings, in which like reference numerals represent the same or similar objects.

BRIEF DESCRIPTION OF THE DRAWINGS

FIGS. 4A, 4B, and 4C are diagrams showing longidinal aberrations with an intermediate focal length setting of the zoom lens according to the first example;

FIGS. 5A, 5B, and 5C are diagrams showing longitudinal aberrations with a telephoto setting of the zoom lens according to the first example;

FIGS. 7A, 7B, and 7C are diagrams showing longitudinal aberrations with a wide-angle setting of the zoom lens according to the second example;

FIGS. 8A, 8B, and 8C are diagrams showing longitudinal aberrations with an intermediate focal length setting of the zoom lens according to the second example;

FIGS. 13A, 13B, and 13C are diagrams showing longitudinal aberrations with a telephoto setting of the zoom lens according to the third example;

FIGS. 23A, 23B, and 23C are diagrams showing longitudinal aberrations with a wide-angle setting of the zoom lens according to the sixth example;

FIGS. 24A, 24B, and 24C are diagrams showing longitudinal aberrations with an intermediate focal length setting of the zoom lens according to the sixth example; and FIGS. 25A, 25B, and 25C are diagrams showing longitudinal aberrations with a telephoto setting of the zoom lens according to the sixth example.

DETAILED DESCRIPTION OF THE PREFERRED EMBODIMENTS

Figure 1:
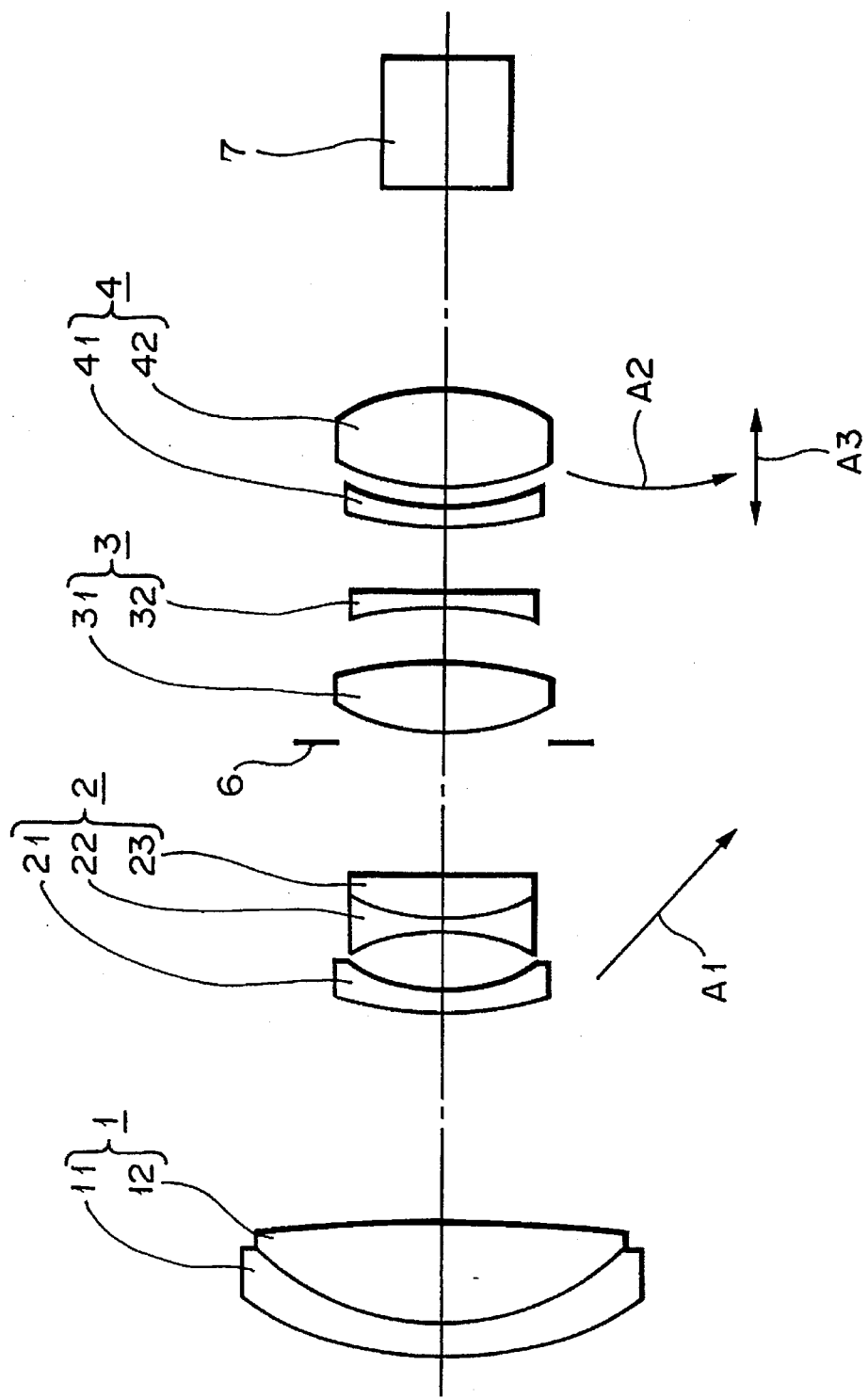
FIG. 1 is a schematic cross-sectional view of an optical arrangement of a zoom lens according to the present invention.

FIG. 1 shows a basic optical arrangement of a zoom lens according to the present invention. As shown in FIG. 1, the zoom lens comprises, successively arranged in the order named from an object side to an image side, a first lens group 1 having a positive refracting power, a second lens group 2 having a negative refracting power and serving as a variator, a third lens group 3 having a positive refracting power, and a fourth lens group 4 having a positive refracting power and serving as a compensator. The first and third lens groups 1, 3 are fixed in position in a lens barrel, and the second and fourth lens groups 2, 4 are movable in the lens barrel. It is assumed that components, indicated by the arrows A1, A2, A3, which are normal and parallel to the optical axis of the zoom lens, correspond respectively to a magnification difference and a lens group movement. Then, the magnification is varied when the second lens group 2 moves as indicated by the arrow A1, and an image plane change caused by varying the magnification is compensated for and focusing is effected when the fourth lens group 4 moves as indicated by the arrows A2, A3. The zoom lens shown in FIG. 1 therefore comprises a rear-focus zoom lens composed of positive, negative, positive, and positive lens groups.

The zoom lens also includes a diaphragm 6 positioned between the second and third lens groups 2, 3, and a glass block 7 positioned as an optical low-pass filter between the fourth lens group 4 and an image plane. The diaphragm 6 may be positioned in other locations.

The first lens group 1 comprises a negative-meniscus lens 11 having a convex surface directed toward the object size, and a positive lens 12. The second lens group 2 comprises a negative-meniscus lens 21 having a convex surface directed toward the object side, a negative lens 22, and a positive lens 23 joined to the negative lens 22. The third lens group 3 comprises a positive lens 31 and a negative lens 32. The fourth lens group 4 comprises, successively arranged in the order named from the object side, a negative-meniscus lens 41 having a convex surface directed toward the object side, and a positive lens 42 joined to or separated from the negative-meniscus lens 41. In the illustrated embodiment, the positive lens 42 is separated from the negative-meniscus lens 41.

Since the fourth lens group 4 is composed of two lenses, it can compensate for aberrations such as a chromatic aberration. The positive lens 42 has a convex surface accommodated in the concave area of the negative-meniscus lens 41, so that the lenses 41, 42 can be of a combined thickness corresponding to the thickness of a single lens. Therefore, the fourth lens group 4 may be very small in size, and hence the overall zoom lens may also be small in size.

The fourth lens group 4 is movable when the magnification is varied and also when focusing is effected. Because the movable fourth lens group 4 is small in size and weight, an actuator for actuating the zoom lens may be also small in size and may have a low power requirement. In addition, the zoom lens can respond quickly to a command signal as when it is focused.

The lenses 41, 42 of the fourth lens group 4 may be made of synthetic resin, or one of the lenses 41, 42 may be made of synthetic resin and the other of optical glass. The synthetic resin may be an acrylic resin such as polymethylmethacrylate (PMMA), polyvinyl chloride (PVC), polycarbonate (PC), a styrene resin such as styrene-acrylonitrile resin (SAN), or a polystyrene molding material such as polystyrene (PSt), which can pass light therethrough and is relatively stable. The synthetic resin may be replaced with another organic material. Generally, the optical glass has a specific gravity substantially in the range of from 2.2 to 6.1, and the synthetic resin has a specific gravity substantially in the range of from 1.05 to 1.4. For example, the PMMA which is most widely used as an optical disc material has a specific gravity of about 1.19. Therefore, the fourth lens group 4 whose lenses are made of synthetic resin is relatively light in weight.

Plastic lenses made of synthetic resin can be mass-produced at a low cost as they can be molded using molds. The lenses of the fourth lens group 4 should be as thin as possible in order to reduce the weight thereof. In the illustrated embodiment, the positive lens 42 is thicker than the negative-meniscus lens 41 as shown. The weight of the fourth lens group 4 and hence the zoom lens may be reduced if at least the thicker positive lens 42 is made of synthetic resin. The two lenses 41, 42 of the fourth lens group 4 are capable of compensating well for a chromatic aberration and a temperature-dependent change in the focal length. Inasmuch as the organic materials can easily be molded into aspherical shapes, the lenses of the fourth lens group 4 can correct a spherical aberration very well.

Generally, when selecting a synthetic resin as a lens material, consideration should be given to the chromatic aberration, a change in the refractive index due to a temperature change, and a change in the focal length due to thermal expansion. In order to correct well for the chromatic aberration, the negative-meniscus lens 41 should preferably be made of a material having a relatively small Abbe number, and the positive lens 42 should preferably be made of a material having a relatively large Abbe number. If both the negative-meniscus lens 41 and the positive lens 42 are to be made of synthetic resin, then, assuming that the Abbe number with respect to the d-lines is represented by vd, it is preferable that the negative-meniscus lens 41 be made of polycarbonate (vd=31), styrene-acrylonitrile resin (vd=35), or polystyrene (vd=31), and the positive lens 42 be made of polymethylmethacrylate (vd=57).

A change in the focal length of a lens of synthetic resin due to a temperature change will be described below. A temperature parameter vT, which is a function of the temperature T, is defined as follows:

$$vT = \left( \frac{\frac{dNd}{dT}}{Nd-1} - \alpha \right)^{-1} \quad (1)$$

where Nd is a refractive index with respect to the d-lines, dNd/dT is a temperature gradient of the refractive index, and $\alpha$ is a coefficient of linear expansion. The temperature parameter vT is disclosed in *Third Order Theory of Thermally Controlled Plastic And Glass Triplets*, written by Lee R. Estell, SPIE Vol. 237, 1980, International Lens Design Conference, p. 392. Specifically, the temperature parameter vT has a value of −4110.7 for polymethylmethacrylate, −4493.5 for polycarbonate, and −3657.8 for polystyrene.

A temperature-dependent change dF/dT in the focal length where F is the focal length is given by the following equation:

$$\frac{dF}{dT} = -(2F^*)^2 \sum_{j=1}^{l} \frac{yi^2 \phi i}{(vT)i} \quad (2)$$

where F* is an F value of the lens, yi is the height of a paraxial marginal ray on an ith surface, $\phi i$ is the power of the ith surface (the reciprocal of the focal length), and (vT) i is the temperature parameter of the ith surface. It can be seen from the equation (2) that the smaller the temperature parameter vT, the greater the temperature-dependent change in the focal length.

The equation (2) is of the same form as an equation representing an on-axis chromatic aberration. Since the temperature parameters vT of synthetic resins do not differ greatly from each other, it is impossible for the two-lens system to eliminate the temperature-dependent change in the focal length. The fourth lens group 4 of the zoom lens according to the present invention has an overall positive refracting power, with the absolute value of the power of the positive lens 42 being larger than the absolute value of the power of the negative-meniscus lens 41. Where both of the two lenses are made of synthetic resin, their materials may be selected such that the absolute value of the temperature parameter of the positive lens 42 is larger than the absolute value of the temperature parameter of the negative-meniscus lens 41, for making the absolute value of dF/dT calculated according to the equation (2) above close to 0 (zero) thereby to minimize the temperature-dependent change in the focal length, i.e., stabilize the temperature characteristics of the focal length of the fourth lens group 4. In this case, the lens materials may also be selected such that the Abbe number of the positive lens 42 is larger than the Abbe number of the negative-meniscus lens 41, for thereby minimizing the chromatic aberration. In order to reduce both the absolute value of dF/dT and the chromatic aberration, the negative-meniscus lens 41 may be made of polystyrene (vd=31, vT=−3657.8) and the positive lens 42 may be made of polymethylmethacrylate (vd=57, vT=−4110.7), for example.

Calculated values of dF/dT for zoom lenses according to Examples 1 through 3 (described later on) at a wide-angle setting with the temperature parameter μT of the optical glass being ∞ are given as follows:

Example 1: 3.7 [μm/deg.]

Example 2: −0.7 [μm/deg.]

Example 3: 5.4 [μm/deg.]

The equation (2) does not apply to zoom lenses according to Examples 4 through 6 (described later on) because the two lenses of the fourth lens group thereof are joined to each other.

With the lenses being made of synthetic resin, therefore, the focal length tends to vary several μm when the temperature changes by 1 degree. Since, however, the fourth lens group 4 is movable for focusing, the temperature-dependent change in the focal length can be absorbed or eliminated thereby. This is exactly the same as a plastic objective lens used in an optical disc reproducing device in that its temperature characteristics do not pose any practical problems. However, inasmuch as the temperature characteristics of the fourth lens group 4 upon zoom tracking when the zoom lens is making zooming movement are likely to cause problems, the synthetic resin or resins of the fourth lens group 4 should be selected from the standpoint of both weight and temperature characteristics.

Synthetic resin can be molded easily and highly accurately into aspherical lenses. In the illustrated embodiment, the lens or lenses of synthetic resin have an aspherical surface or surfaces. However, if the zoom lens is not required to have highly strict specifications, then an aspherical lens or lenses may not necessarily be employed. According to the present invention, the shape of an aspherical surface of a synthetic resin lens is defined as follows:

$$Z = \frac{y^2/R}{1+\sqrt{1-(K+1)Y^2/R^2}} + AD \cdot y^2 + AE \cdot y^6 + AF \cdot y^8 + AG \cdot Y^{10} \quad (3)$$

where K is a conic constant, y is the height from the optical axis, Z is the distance from a plane tangential to the vertex of the aspherical surface to a point on the aspherical surface at the height y from the optical axis, R is the paraxial radius of curvature, and AD, AE, AF, and AG are aspherical coefficients of fourth, sixth, eighth, and tenth orders, respectively.

Lens data, aspherical data, and variable data of zoom lenses according to Examples 1 through 6 will be described below. In each of Examples 1 through 6, the lens data include radii Ri of curvature of ith surfaces (i=1, 2, 3, ...) as counted from the object side to the image plane size, surface-to-surface distances Di between ith and (i+1)th surfaces, refractive indexes Ni with respect to the d-lines and Abbe numbers vi of the medium between the ith and (i+1)th surfaces. Where the medium is air, the data Ni, vi are left blank. Those lens data which are marked with * are associated with an aspherical surface, and the radius R of curvature of such an aspherical surface means a paraxial radius of curvature. The aspherical data include conic constants K of the surfaces indicated on the left, and aspherical coefficients AD, AE, AF, AG of fourth, sixth, eighth, and tenth orders of the surfaces indicated on the left. An aspherical shape is determined when these conic constant and aspherical coefficient are substituted in the equation (3).

In all of Examples 1 through 6, the zoom lens has a focal length f in the range of from 10 to 60 mm, an F value in the range of from 2.1 to 2.8, and a half field angle ω ranging from 23.2° to 4.1°. Values of variable distances Di at a wide-angle setting (f=10.0), an intermediate setting (f=30.3), and a telephoto setting (f=60.0) are given as the variable data.

The aberration diagrams of Examples 1 through 6, show e-lines, F-lines, d-lines, aberration curves S on the sagittal plane, and aberration curves T on the tangential plane.

EXAMPLE 1

Figure 2:
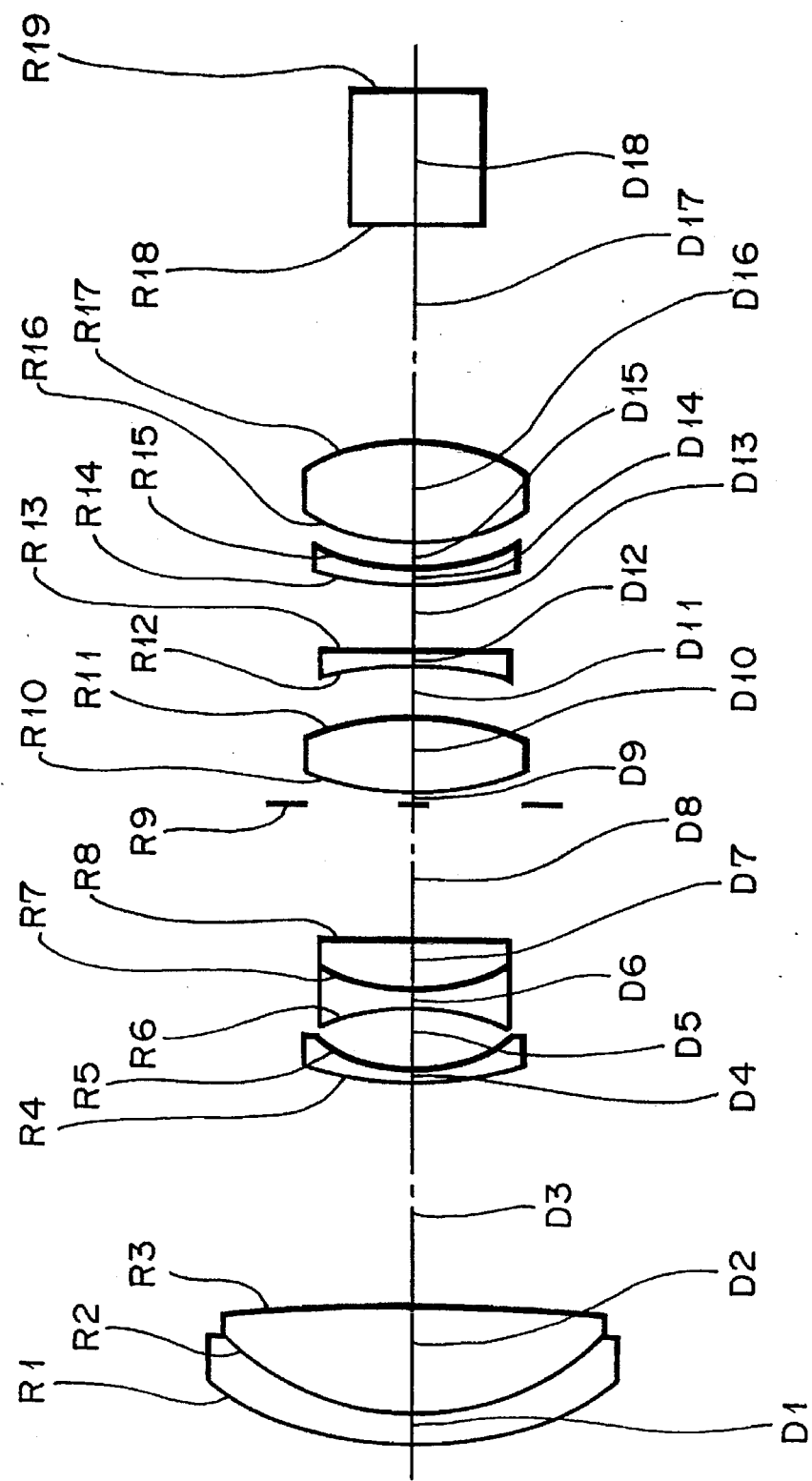
FIG. 2 is a schematic cross-sectional view of a zoom lens according to a first example of the present invention.
Figures 3A, 3B, 3C:
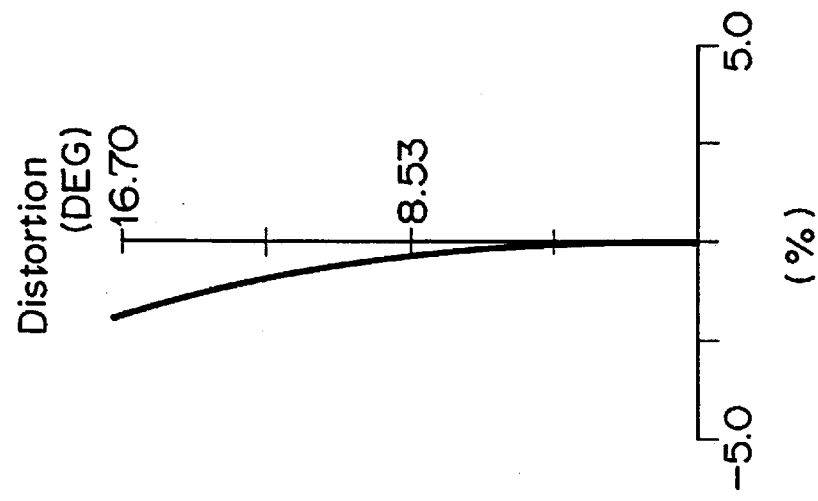
FIGS. 3A, 3B, and 3C are diagrams showing longitudnal aberrations with a wide-angle setting of the zoom lens according to the first example.

In the zoom lens according to Example 1, the negative-meniscus lens 41 and the positive lens 42 of the fourth lens group 4 are separated from each other, and both are made of synthetic resin. The negative-meniscus lens 41 is made of polycarbonate, and the positive lens 42 of polymethylmethacrylate, so that the temperature-dependent change in the focal length as expressed by the equation (2) will be minimized. The zoom lens according to Example 1 has an optical arrangement as shown in FIG. 2. FIGS. 3A through 3C, 4A through 4C, and 5A through 5C show longitudinal aberrations of the zoom lens according to Example 1 at the wide-angle setting (f=10.0), the intermediate setting (f=30.3), and the telephoto setting (f=60.0), respectively.

A. Lens data:

| i | Ri | Di | Ni | vi |
|---|---|---|---|---|
| 1 | 25.42 | 1.71 | 1.805 | 25.5 |
| 2 | 17.95 | 6.86 | 1.589 | 61.3 |
| *3 | −151.99 | 0.43 (variable) | | |
| 4 | 21.02 | 1.14 | 1.834 | 37.2 |
| 5 | 9.27 | 3.92 | | |
| 6 | −12.32 | 1.14 | 1.697 | 48.5 |
| 7 | 11.69 | 3.29 | 1.847 | 23.8 |
| 8 | ∞ | 24.00 (variable) | | |
| 9 | ∞ (diaphragm) | 0.57 | | |
| *10 | 15.08 | 4.29 | 1.589 | 61.3 |
| *11 | −21.86 | 4.01 | | |
| 12 | −24.16 | 1.14 | 1.847 | 23.8 |
| 13 | 83.03 | 7.73 (variable) | | |
| *14 | 20.59 | 1.14 | 1.586 | 31 (PC) |
| 15 | 11.41 | 1.82 | | |
| *16 | 13.60 | 6.43 | 1.492 | 57 (PMMA) |
| *17 | −13.41 | 10.63 (variable) | | |
| 18 | ∞ | 8.29 | 1.517 | 64.2 |
| 19 | ∞ | | | |

B. Aspherical data:

| Surface | K | AD | AE | AF | AG |
|---|---|---|---|---|---|
| 3rd | 0 | $0.567 \times 10^{-5}$ | $-0.385 \times 10^{-8}$ | $-0.966 \times 10^{-11}$ | $0.301 \times 10^{-13}$ |
| 10th | 0 | $-0.106 \times 10^{-4}$ | $-0.285 \times 10^{-6}$ | $-0.196 \times 10^{-9}$ | $0.144 \times 10^{-9}$ |
| 11th | 0 | $0.656 \times 10^{-4}$ | $-0.143 \times 10^{-6}$ | $-0.397 \times 10^{-9}$ | $0.144 \times 10^{-9}$ |
| 14th | 0 | $-0.390 \times 10^{-4}$ | 0 | 0 | 0 |
| 16th | 0 | $-0.438 \times 10^{-4}$ | 0 | 0 | 0 |
| 17th | 0 | $0.457 \times 10^{-4}$ | 0 | 0 | 0 |

C. Variable data:

| | f = 10.0 | f = 30.3 | f = 60.0 |
|---|---|---|---|
| D3 | 0.43 | 14.83 | 20.95 |
| D8 | 24.00 | 9.59 | 3.48 |
| D13 | 7.73 | 4.42 | 8.16 |
| D17 | 10.63 | 13.94 | 10.20 |

EXAMPLE 2

Figure 6:
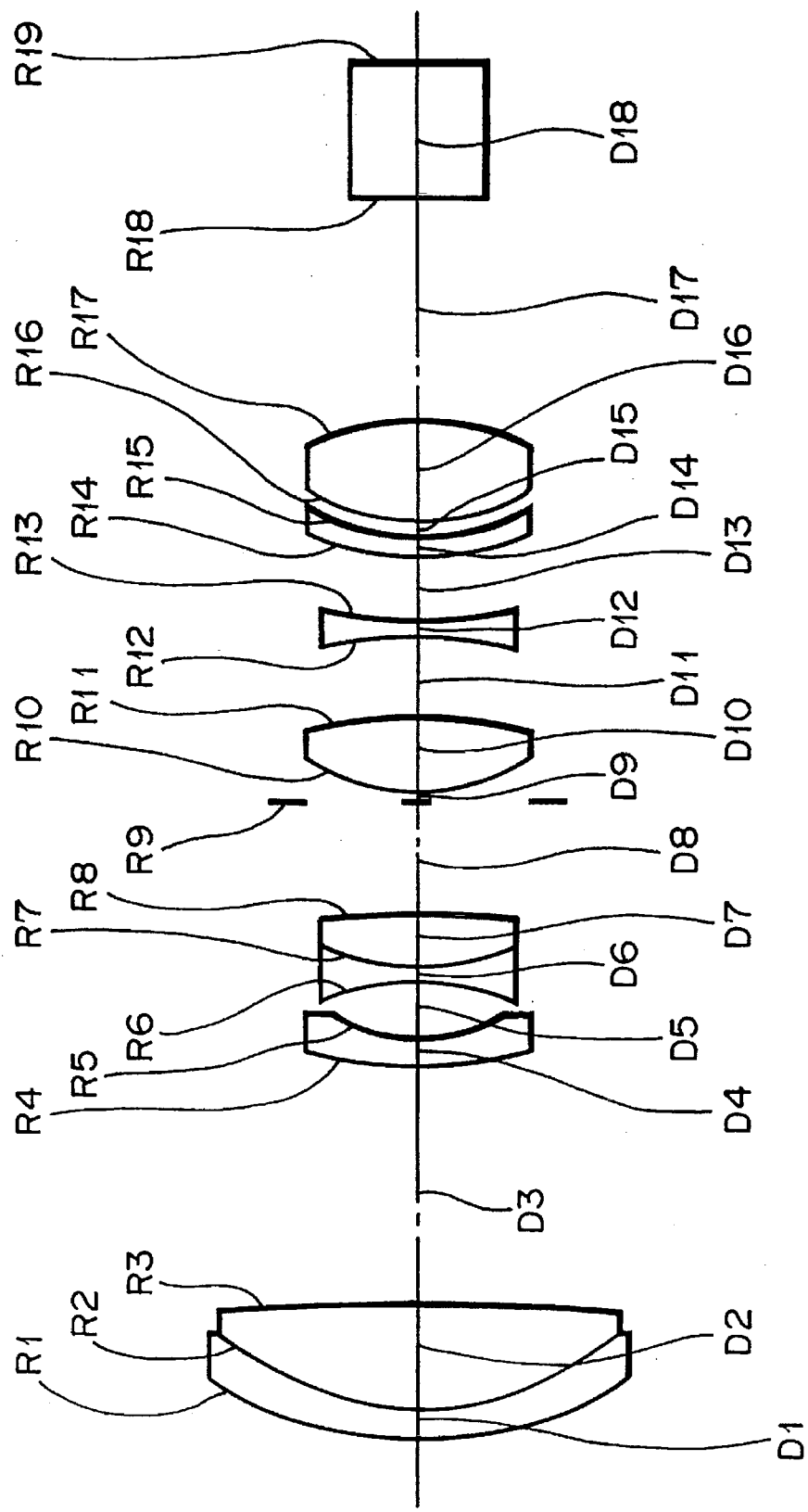
FIG. 6 is a schematic cross-sectional view of a zoom lens according to a second example of the present invention.
Figure 9C:
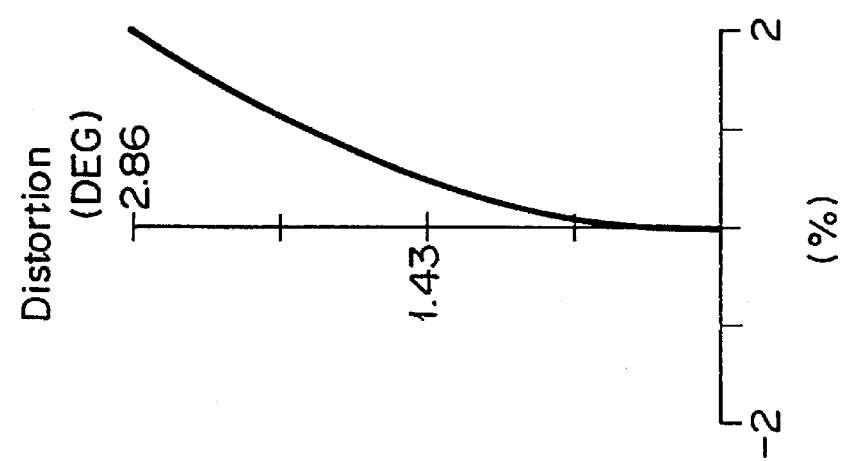
FIGS. 9A, 9B, and 9C are diagrams showing longitudinal aberrations with a telephoto setting of the zoom lens according to the second example.
Figure 9B:
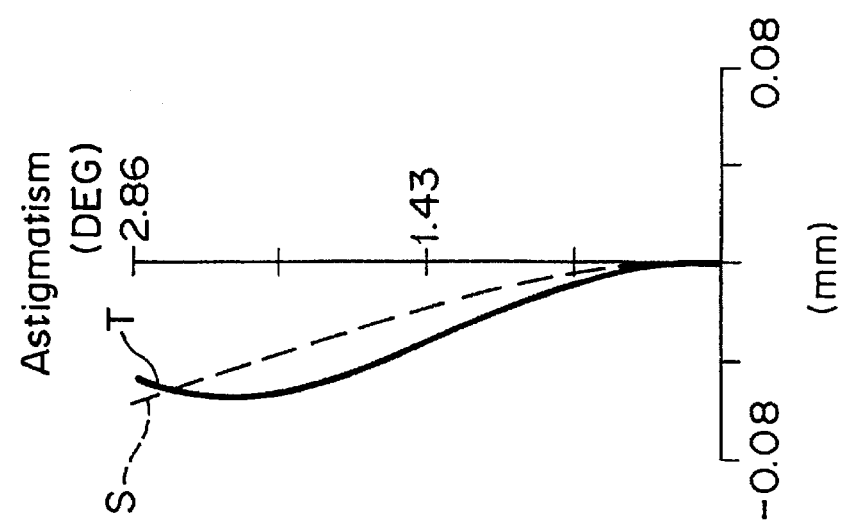
Figure 9A:
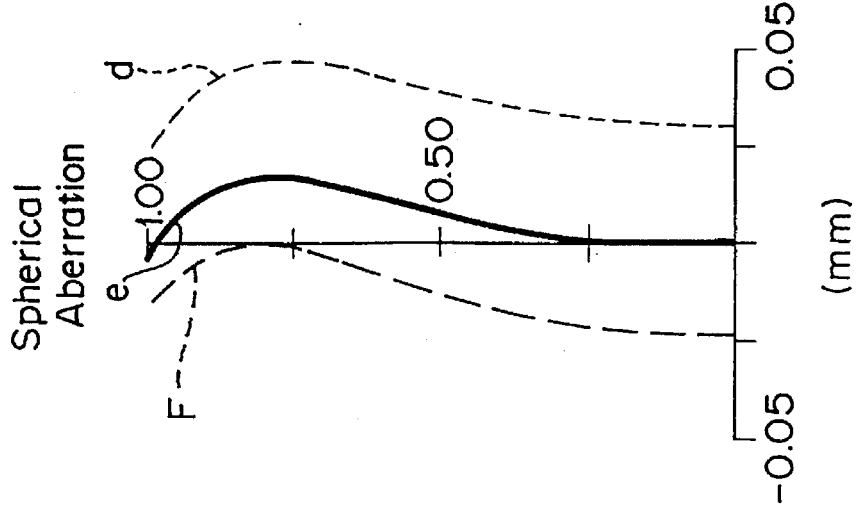

In the zoom lens according to Example 2, the negative-meniscus lens 41 and the positive lens 42 of the fourth lens group 4 are separate from each other, the negative-meniscus lens 41 is made of synthetic resin (specifically, polycarbonate), and the positive lens 42 is made of optical glass. The zoom lens according to Example 2 has an optical arrangement as shown in FIG. 6. FIGS. 7A through 7C, 8A through 8C, and 9A through 9C show longitudinal aberrations of the zoom lens according to Example 2 at the wide-angle setting (f=10.0), the intermediate setting (f=30.3), and the telephoto setting (f=60.0), respectively.

A. Lens data:

| i | Ri | Di | Ni | vi |
|---|---|---|---|---|
| 1 | 26.62 | 1.71 | 1.805 | 25.5 |
| 2 | 18.76 | 6.86 | 1.589 | 61.3 |
| *3 | −148.01 | 1.60 (variable) | | |
| 4 | 36.74 | 1.14 | 1.834 | 37.2 |
| 5 | 10.27 | 3.92 | | |
| 6 | −12.51 | 1.14 | 1.697 | 48.5 |
| 7 | 13.86 | 3.29 | 1.847 | 23.8 |
| 8 | −83.08 | 22.11 (variable) | | |
| 9 | ∞ (diaphragm) | 0.57 | | |
| *10 | 14.98 | 4.29 | 1.589 | 61.3 |
| *11 | −25.69 | 5.31 | | |
| 12 | −23.71 | 1.14 | 1.847 | 23.8 |
| 13 | 43.96 | 7.77 (variable) | | |
| *14 | 17.44 | 1.14 | 1.586 | 61 (pc) |
| 15 | 13.24 | 0.97 | | |
| *16 | 13.50 | 6.43 | 1.517 | 64.2 |
| *17 | −14.80 | 10.86 (variable) | | |
| 18 | ∞ | 8.29 | 1.517 | 64.2 |
| 19 | ∞ | | | |

B. Aspherical data:

| Surface | K | AD | AE | AF | AG |
|---|---|---|---|---|---|
| 3rd | 0 | 0.494 × 10⁻⁵ | −0.286 × 10⁻⁸ | −0.788 × 10⁻¹¹ | 0.209 × 10⁻¹³ |
| 10th | 0 | −0.105 × 10⁻⁴ | −0.238 × 10⁻⁶ | −0.282 × 10⁻⁸ | 0.238 × 10⁻⁹ |
| 11th | 0 | 0.587 × 10⁻⁴ | −0.146 × 10⁻⁶ | −0.327 × 10⁻⁸ | 0.277 × 10⁻⁹ |
| 14th | 0 | −0.252 × 10⁻⁴ | 0 | 0 | 0 |
| 16th | 0 | −0.526 × 10⁻⁴ | 0 | 0 | 0 |
| 17th | 0 | 0.717 × 10⁻⁴ | 0 | 0 | 0 |

C. Variable data:

| | f = 10.0 | f = 30.3 | f = 60.0 |
|---|---|---|---|
| D3 | 1.60 | 15.88 | 22.85 |
| D8 | 22.11 | 7.83 | 0.86 |
| D13 | 7.77 | 4.11 | 7.91 |
| D17 | 10.86 | 14.51 | 10.72 |

EXAMPLE 3

Figure 10:
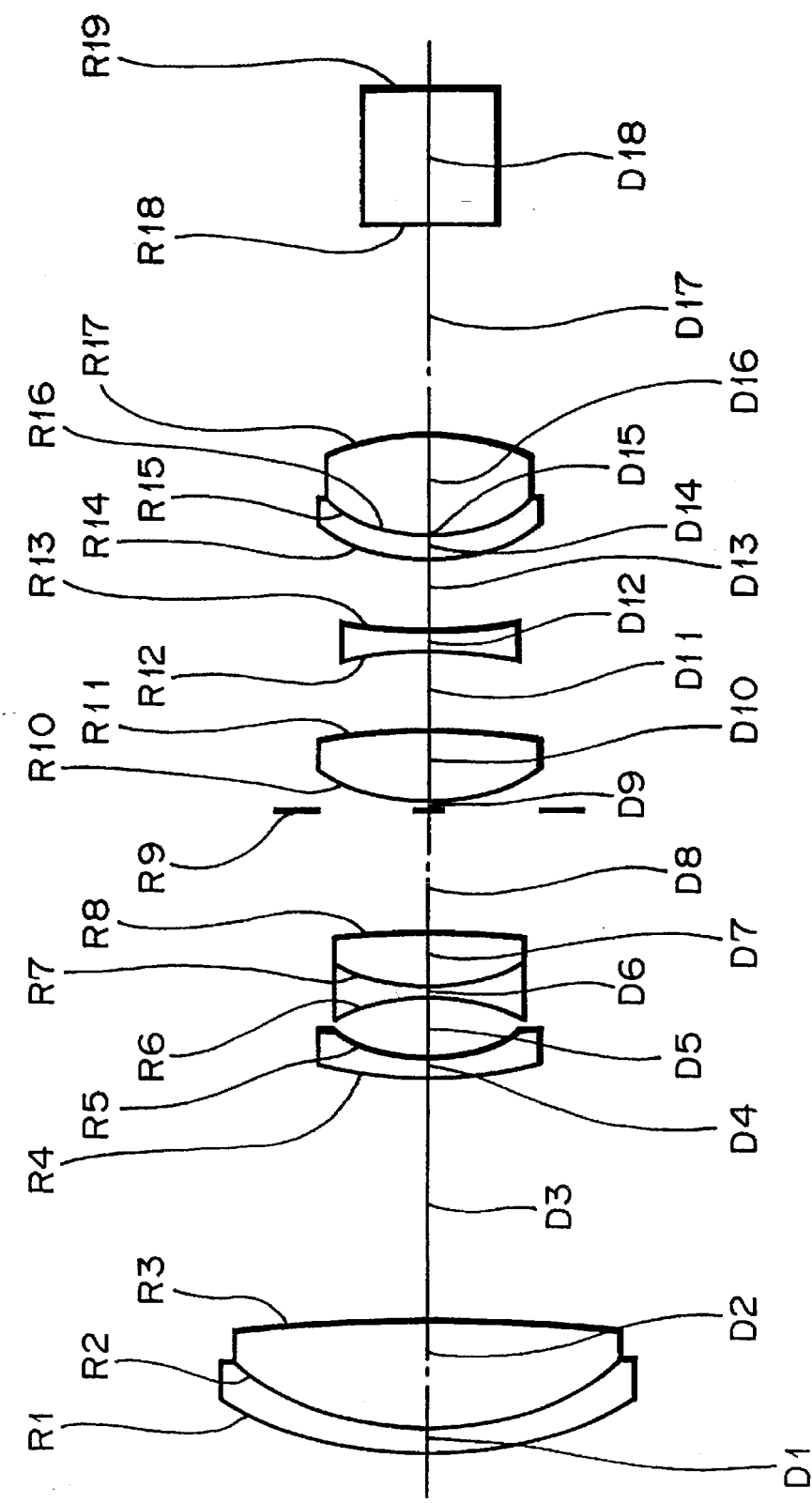
FIG. 10 is a schematic cross-sectional view of a zoom lens according to a third example of the present invention.
Figure 11C:
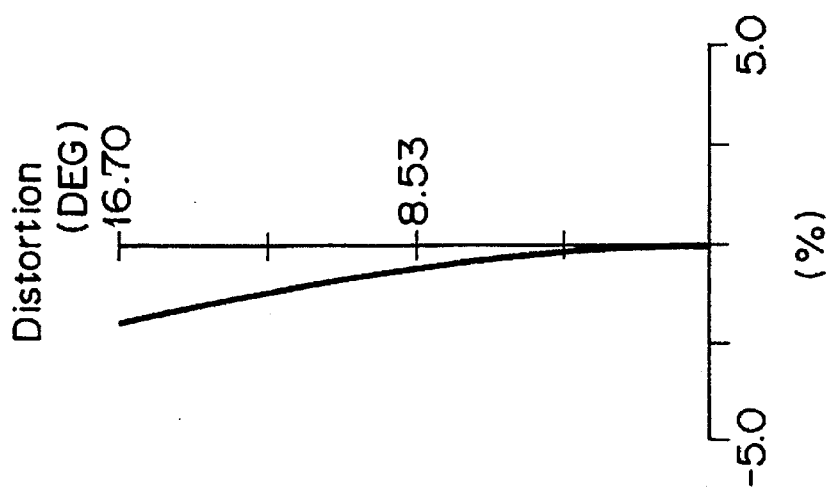
FIGS. 11A, 11B, and 11C are diagrams showing longitudinal aberrations with a wide-angle setting of the zoom lens according to the third example.
Figure 11B:
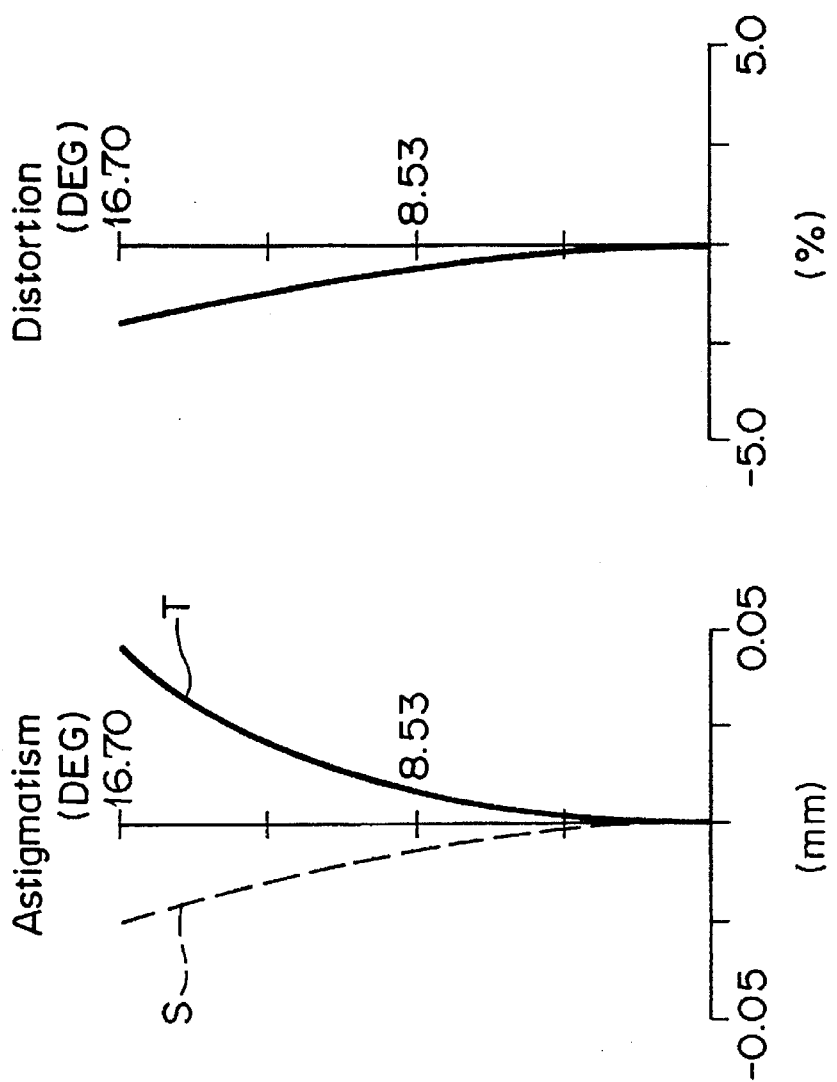
Figure 11A:
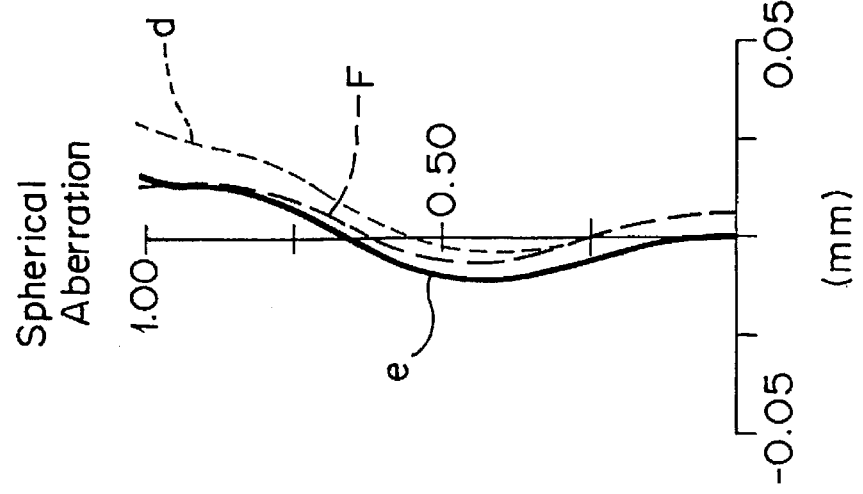
Figure 12C:
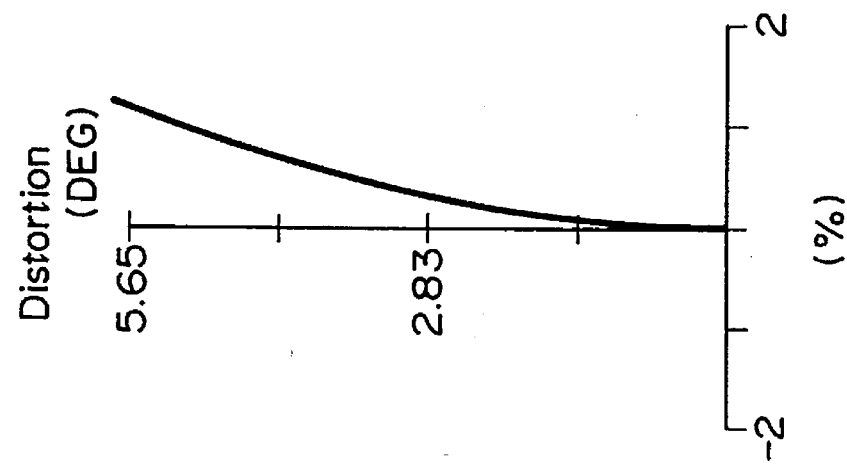
FIGS. 12A, 12B, and 12C are diagrams showing longitudinal aberrations with an intermediate focal length setting of the zoom lens according to the third example.
Figure 12B:
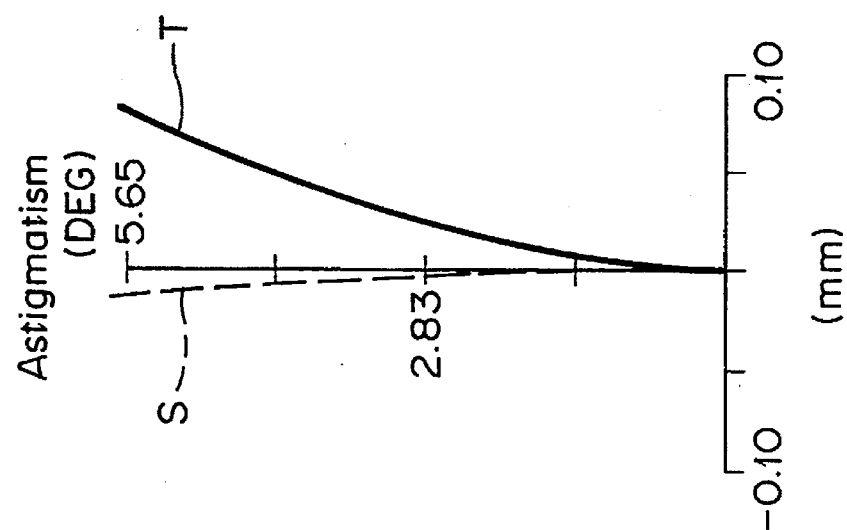
Figure 12A:
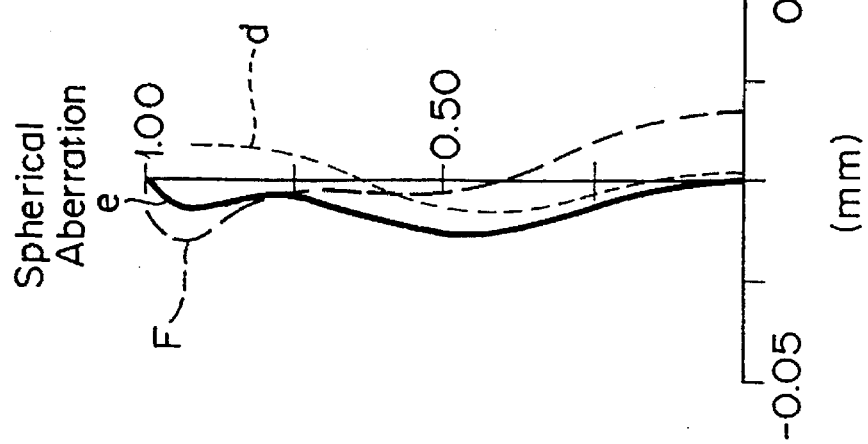

In the zoom lens according to Example 3, the negative-meniscus lens 41 and the positive lens 42 of the fourth lens group 4 are separated from each other, the negative-meniscus lens 41 is made of optical glass, and the positive lens 42 is made of synthetic resin (specifically, polymethylmethacrylate). The zoom lens according to Example 3 has an optical arrangement as shown in FIG. 10. FIGS. 11A through 11C, 12A through 12C, and 13A through 13C show longitudinal aberrations of the zoom lens according to Example 3 at the wide-angle setting (f=10.0), the intermediate setting (f=30.3), and the telephoto setting (f=60.0), respectively.

A. Lens data:

| i | Ri | Di | Ni | vi |
|---|---|---|---|---|
| 1 | 27.61 | 1.71 | 1.805 | 25.5 |
| 2 | 19.45 | 6.86 | 1.589 | 61.3 |
| *3 | −153.09 | 0.91 (variable) | | |
| 4 | 33.16 | 1.14 | 1.834 | 37.2 |
| 5 | 10.68 | 3.92 | | |
| 6 | −13.10 | 1.14 | 1.691 | 48.5 |
| 7 | 14.09 | 3.29 | 1.847 | 23.8 |
| 8 | −106.24 | 23.39 (variable) | | |
| 9 | ∞ (diaphragm) | 0.57 | | |
| *10 | 14.31 | 4.29 | 1.589 | 61.3 |
| *11 | −26.27 | 5.35 | | |
| 12 | −23.19 | 1.14 | 1.847 | 23.8 |
| 13 | 35.08 | 8.88 (variable) | | |
| *14 | 13.56 | 1.14 | 1.689 | 31.1 |
| 15 | 10.51 | 0.14 | | |
| *16 | 10.35 | 6.43 | 1.492 | 57 (PMMA) |
| *17 | −15.26 | 9.93 (variable) | | |
| 18 | ∞ | 8.29 | 1.517 | 64.2 |
| 19 | ∞ | | | |

B. Aspherical data:

| Surface | K | AD | AE | AF | AG |
|---|---|---|---|---|---|
| 3rd | 0 | 0.446 × 10⁻⁵ | −0.404 × 10⁻⁸ | 0.499 × 10⁻¹¹ | −0.920 × 10⁻¹⁴ |
| 10th | 0 | −0.114 × 10⁻⁴ | −0.319 × 10⁻⁶ | 0.440 × 10⁻⁸ | 0.238 × 10⁻⁹ |
| 11th | 0 | 0.603 × 10⁻⁴ | −0.147 × 10⁻⁶ | 0.222 × 10⁻⁸ | 0.317 × 10⁻⁹ |
| 14th | 0 | −0.874 × 10⁻⁵ | 0 | 0 | 0 |
| 16th | 0 | −0.697 × 10⁻⁴ | 0 | 0 | 0 |
| 17th | 0 | 0.106 × 10⁻⁴ | 0 | 0 | 0 |

C. Variable data:

| | f = 10.0 | f = 30.3 | f = 60.0 |
|---|---|---|---|
| D3 | 0.91 | 15.98 | 23.45 |
| D8 | 23.39 | 8.32 | 0.86 |
| D13 | 8.88 | 5.32 | 9.17 |
| D17 | 9.93 | 13.49 | 9.64 |

EXAMPLE 4

Figure 14:
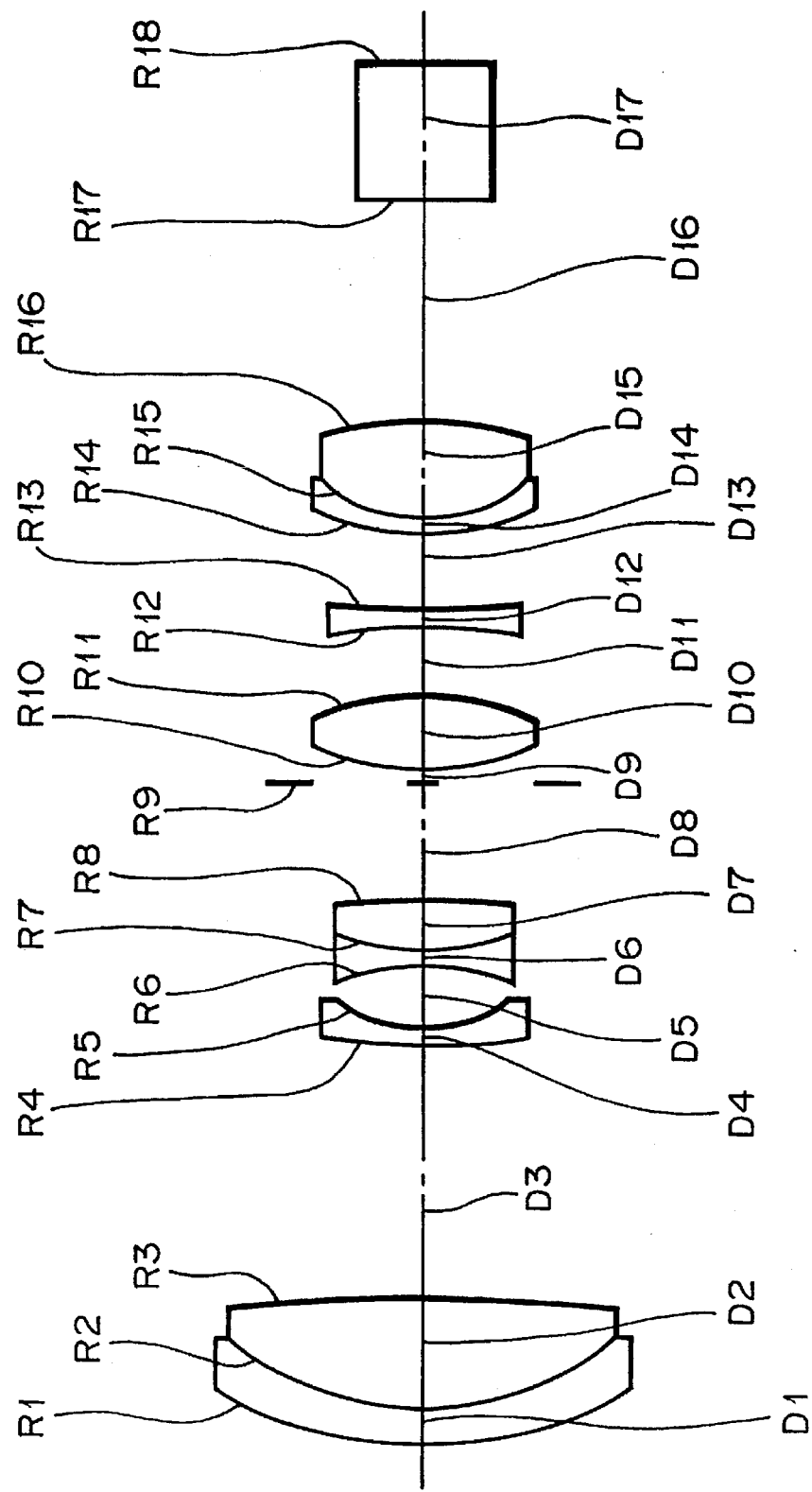
FIG. 14 is a schematic cross-sectional view of a zoom lens according to a fourth example of the present invention.
Figure 15C:
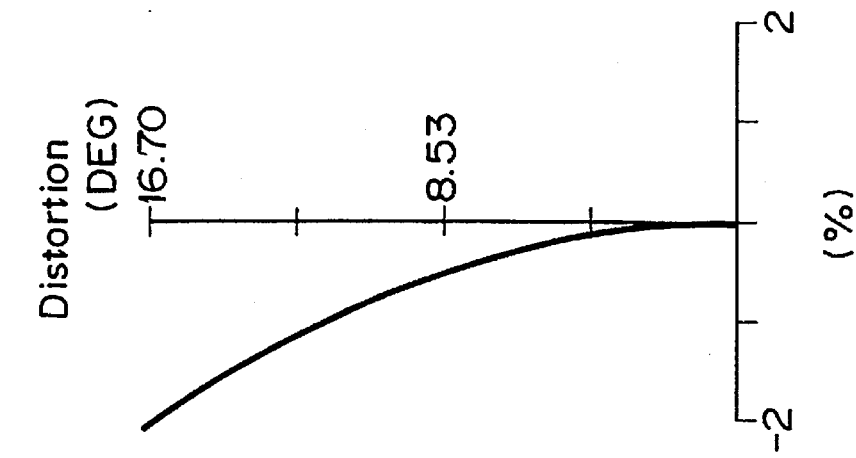
FIGS. 15A, 15B, and 15C are diagrams showing longitudinal aberrations with a wide-angle setting of the zoom lens according to the fourth example.
Figure 15B:
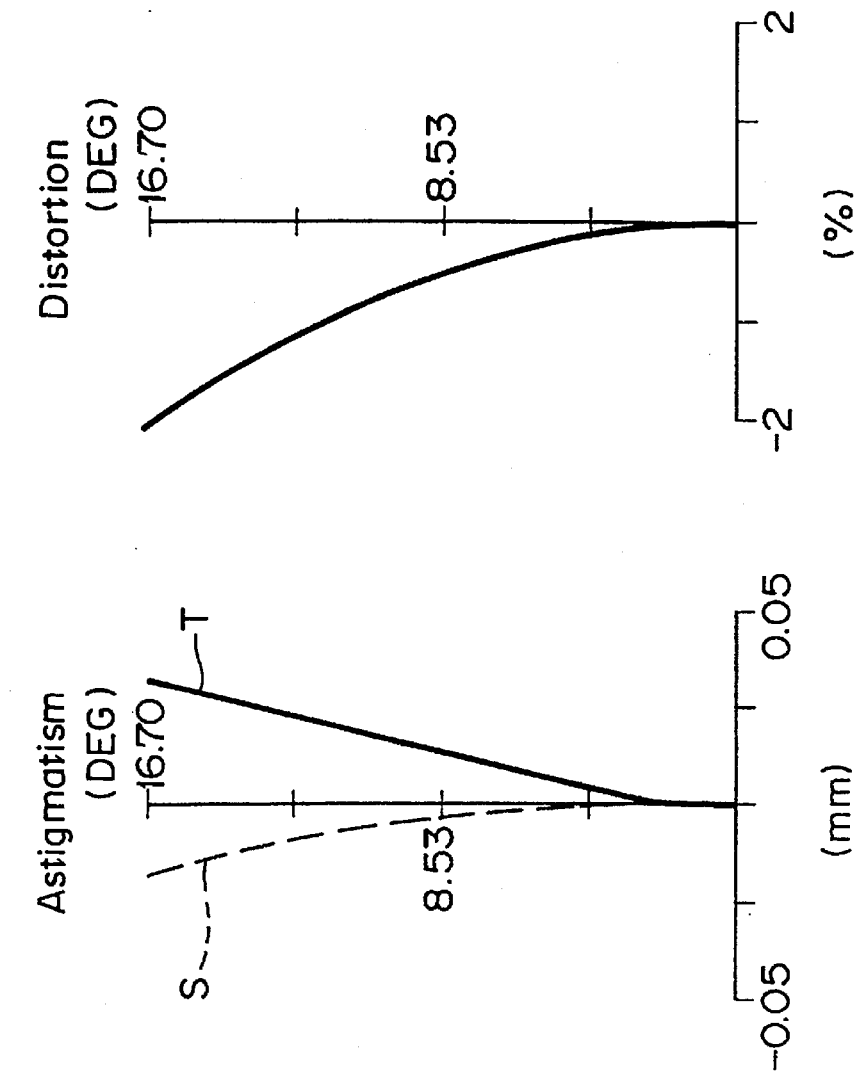
Figure 15A:
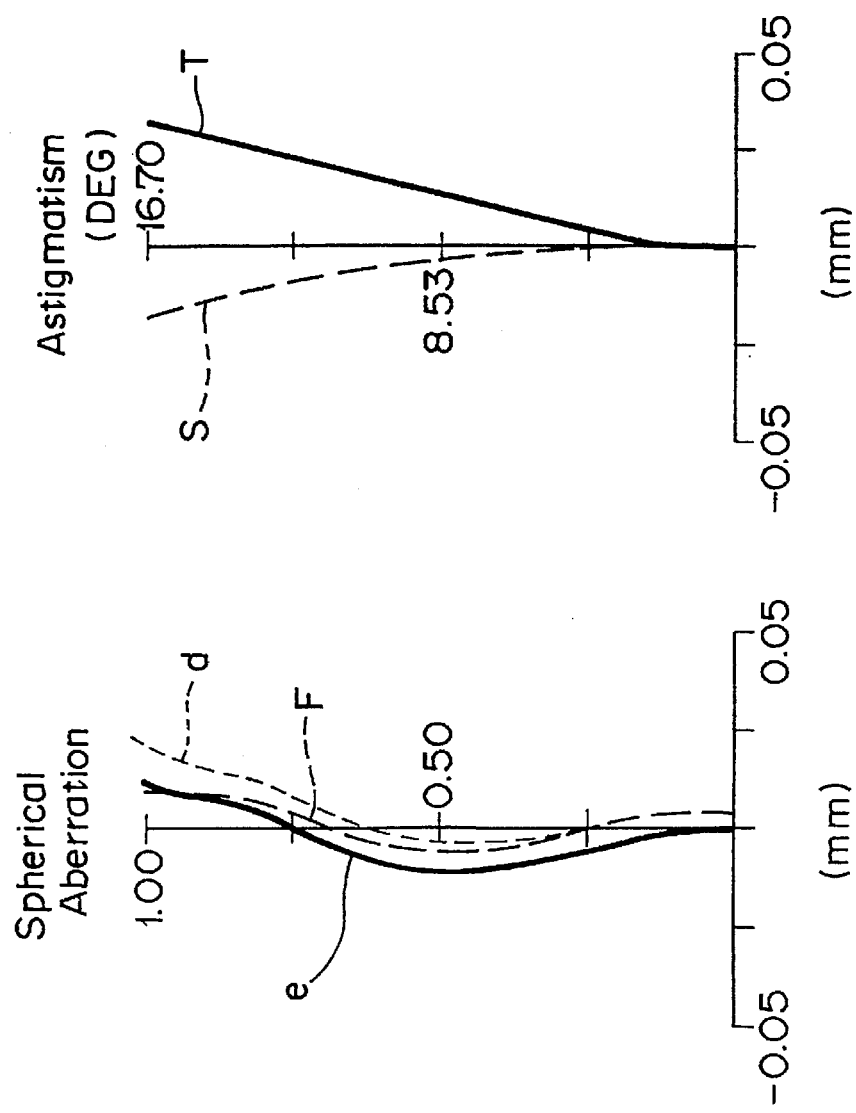
Figures 16A, 16B, 16C:
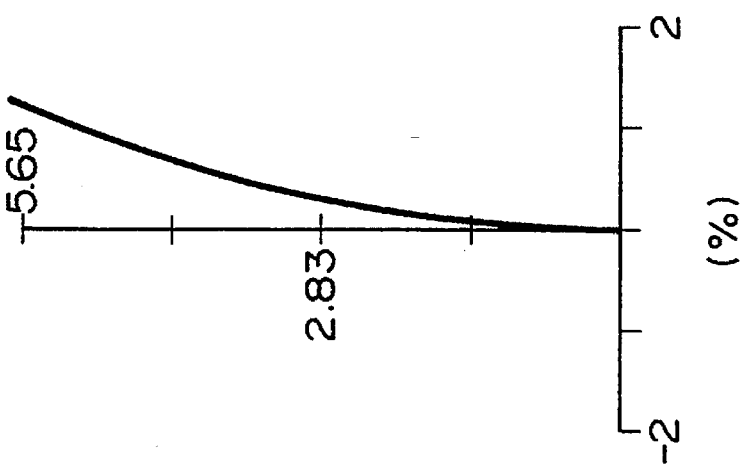
FIGS. 16A, 16B, and 16C are diagrams showing longitudinal aberrations with an intermediate focal length setting of the zoom lens according to the fourth example.
Figure 17C:
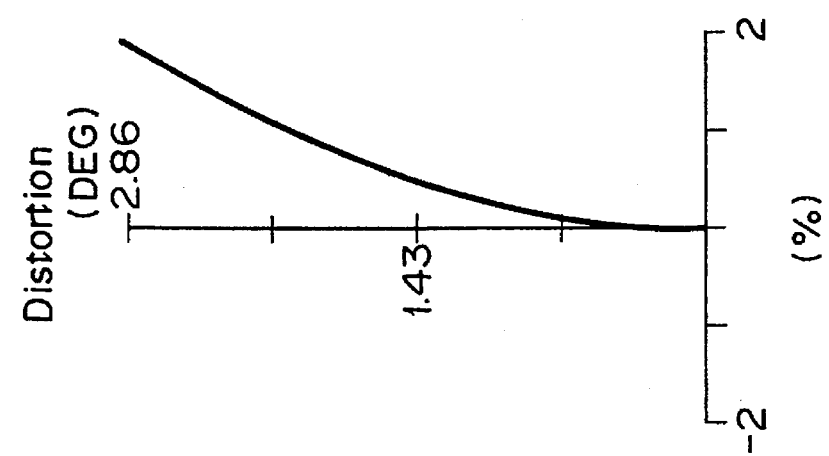
FIGS. 17A, 17B, and 17C are diagrams showing longitudinal aberrations with a telephoto setting of the zoom lens according to the fourth example.
Figure 17B:
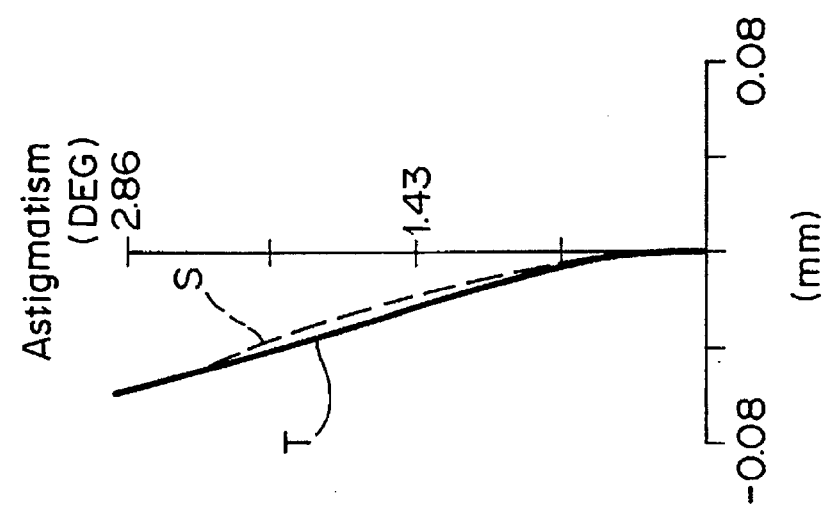
Figure 17A:
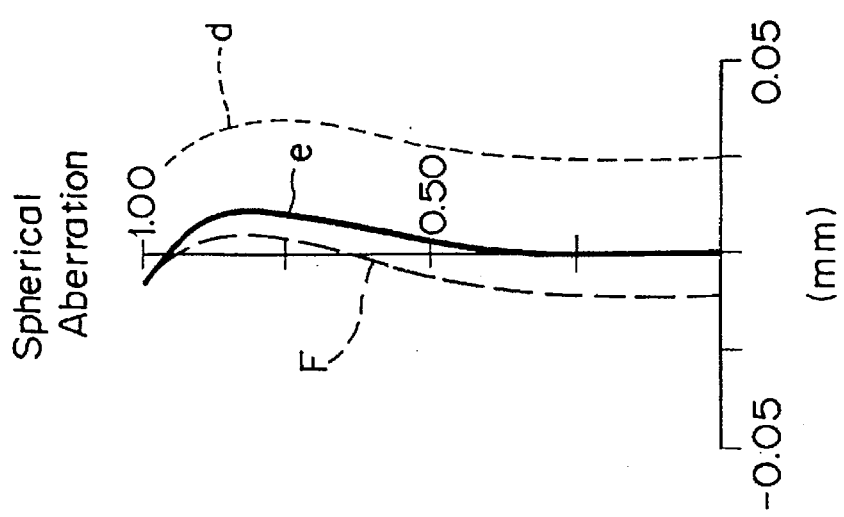

In the zoom lens according to Example 4, the negative-meniscus lens 41 and the positive lens 42 of the fourth lens group 4 are joined to each other, the negative-meniscus lens 41 is made of synthetic resin (specifically, polycarbonate), and the positive lens 42 is made of synthetic resin (specifically, polymethylmethacrylate). The zoom lens according to Example 4 has an optical arrangement as shown in FIG. 14. FIGS. 15A through 15C, 16A through 16C, and 17A through 17C show longitudinal aberrations of the zoom lens according to Example 4 at the wide-angle setting (f=10.0), the intermediate setting (f=30.3), and the telephoto setting (f=60.0), respectively.

A. Lens data:

| i | Ri | Di | Ni | vi |
|---|---|---|---|---|
| 1 | 27.48 | 1.71 | 1.805 | 25.5 |
| 2 | 19.24 | 6.86 | 1.589 | 61.3 |
| *3 | −156.54 | 1.89 (variable) | | |
| 4 | 38.88 | 1.14 | 1.834 | 37.2 |
| 5 | 10.50 | 3.92 | | |
| 6 | −12.50 | 1.14 | 1.697 | 48.5 |
| 7 | 14.37 | 3.29 | 1.847 | 23.8 |
| 8 | −73.90 | 22.74 (variable) | | |
| 9 | ∞ (diaphragm) | 0.57 | | |
| *10 | 15.38 | 4.29 | 1.589 | 61.3 |
| *11 | −26.47 | 5.09 | | |
| 12 | −30.71 | 1.14 | 1.847 | 23.8 |
| 13 | 38.64 | 8.86 (variable) | | |
| *14 | 14.07 | 1.14 | 1.586 | 31 (PC) |
| *15 | 9.37 | 6.43 | 1.492 | 57 (PMMA) |
| 16 | −17.11 | 10.02 (variable) | | |
| 17 | ∞ | 8.29 | 1.517 | 64.2 |
| 18 | ∞ | | | |

B. Aspherical data:

| Surface | K | AD | AE | AF | AG |
|---|---|---|---|---|---|
| 3rd | 0 | $0.442 \times 10^{-5}$ | $-0.210 \times 10^{-8}$ | $-0.699 \times 10^{-11}$ | $0.160 \times 10^{-13}$ |
| 10th | 0 | $-0.101 \times 10^{-4}$ | $-0.295 \times 10^{-6}$ | $0.240 \times 10^{-8}$ | $0.203 \times 10^{-9}$ |
| 11th | 0 | $0.585 \times 10^{-4}$ | $-0.212 \times 10^{-6}$ | $0.833 \times 10^{-8}$ | $0.265 \times 10^{-9}$ |
| 14th | 0 | $-0.397 \times 10^{-4}$ | $-0.930 \times 10^{-7}$ | $-0.102 \times 10^{-8}$ | $0.710 \times 10^{-10}$ |
| 15th | 0 | $-0.461 \times 10^{-4}$ | $-0.118 \times 10^{-5}$ | $-0.620 \times 10^{-8}$ | $0.711 \times 10^{-10}$ |
| 16th | 0 | $0.107 \times 10^{-3}$ | $-0.547 \times 10^{-7}$ | $0.201 \times 10^{-9}$ | $0.112 \times 10^{-9}$ |

C. Variable data:

| | f = 10.0 | f = 30.3 | f = 60.0 |
|---|---|---|---|
| D3 | 1.89 | 16.64 | 23.92 |
| D8 | 22.74 | 7.99 | 0.71 |
| D13 | 8.86 | 4.95 | 8.15 |
| D16 | 10.02 | 13.93 | 10.74 |

EXAMPLE 5

Figure 18:
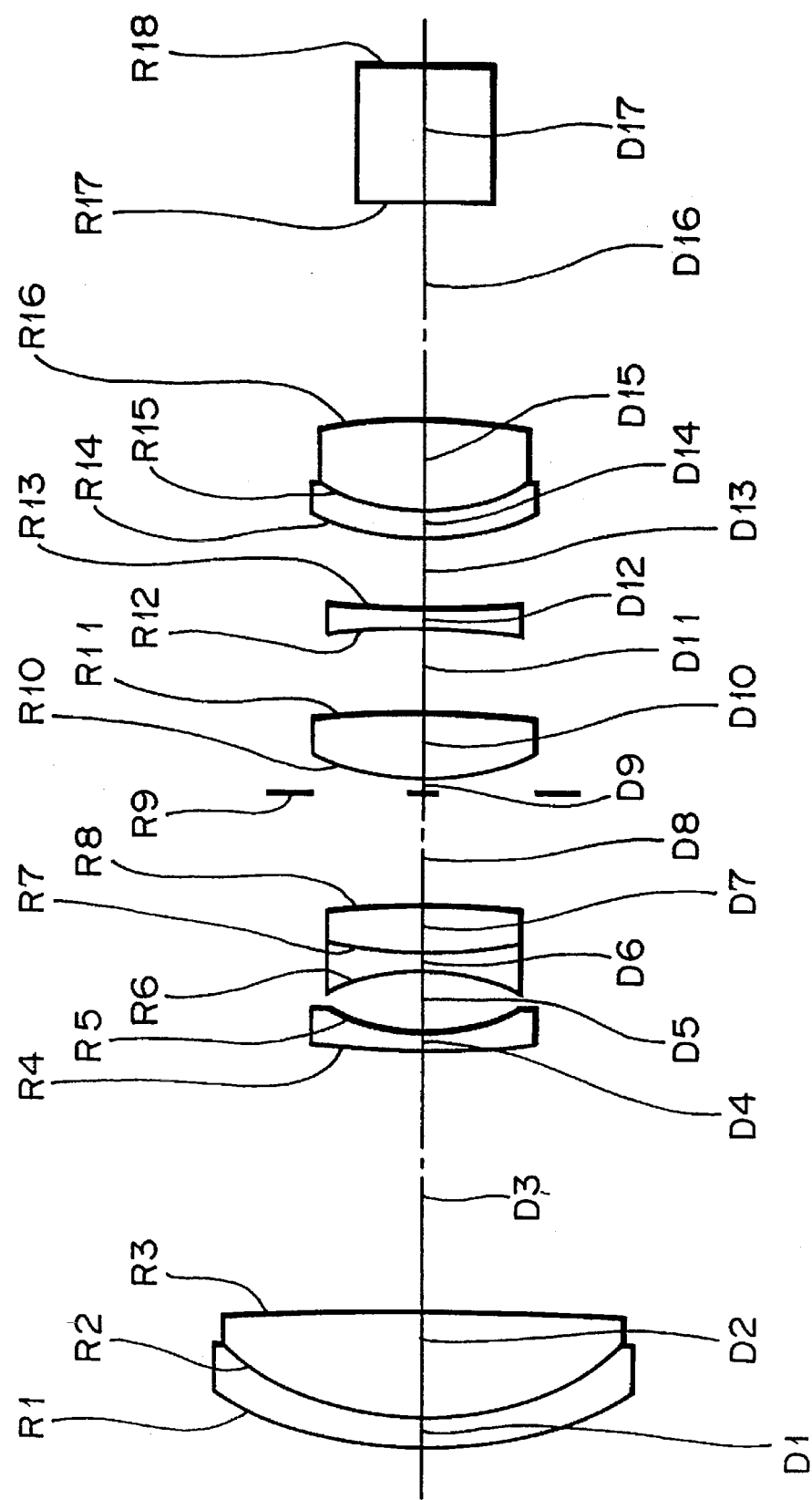
FIG. 18 is a schematic cross-sectional view of a zoom lens according to a fifth example of the present invention.
Figure 19C:
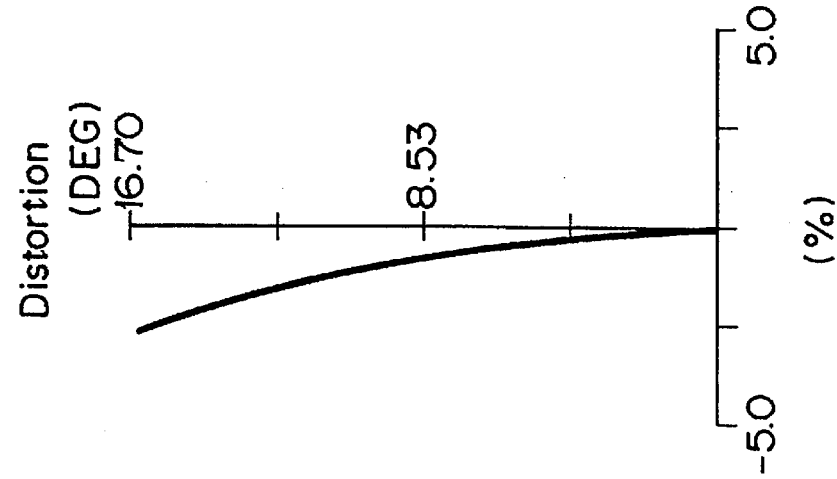
FIGS. 19A, 19B, and 19C are diagrams showing longitudinal aberrations with a wide-angle setting of the zoom lens according to the fifth example.
Figure 19B:
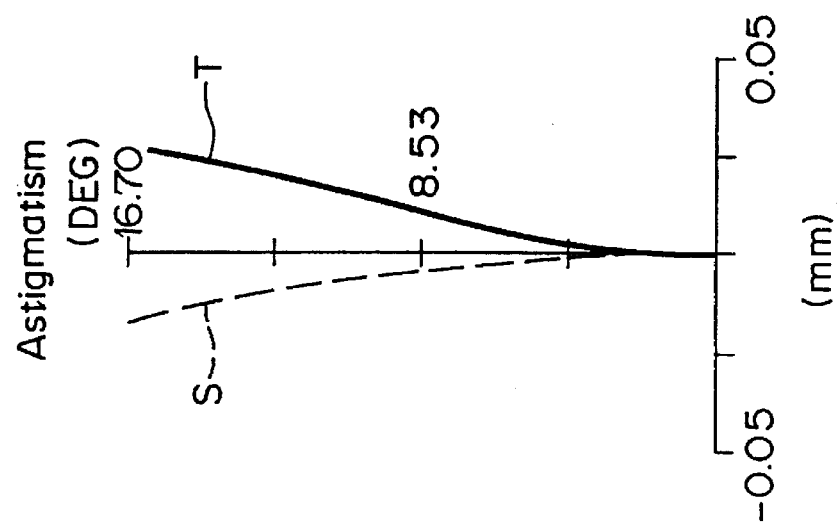
Figure 19A:
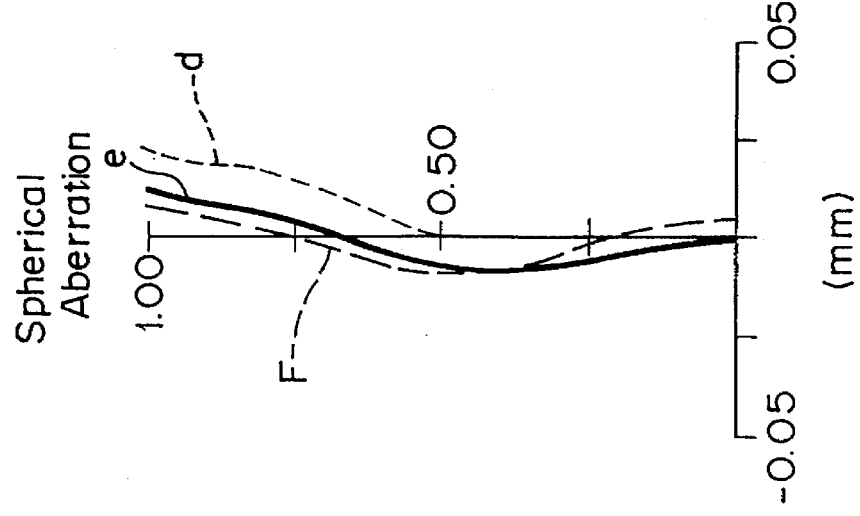
Figures 20A, 20B, 20C:
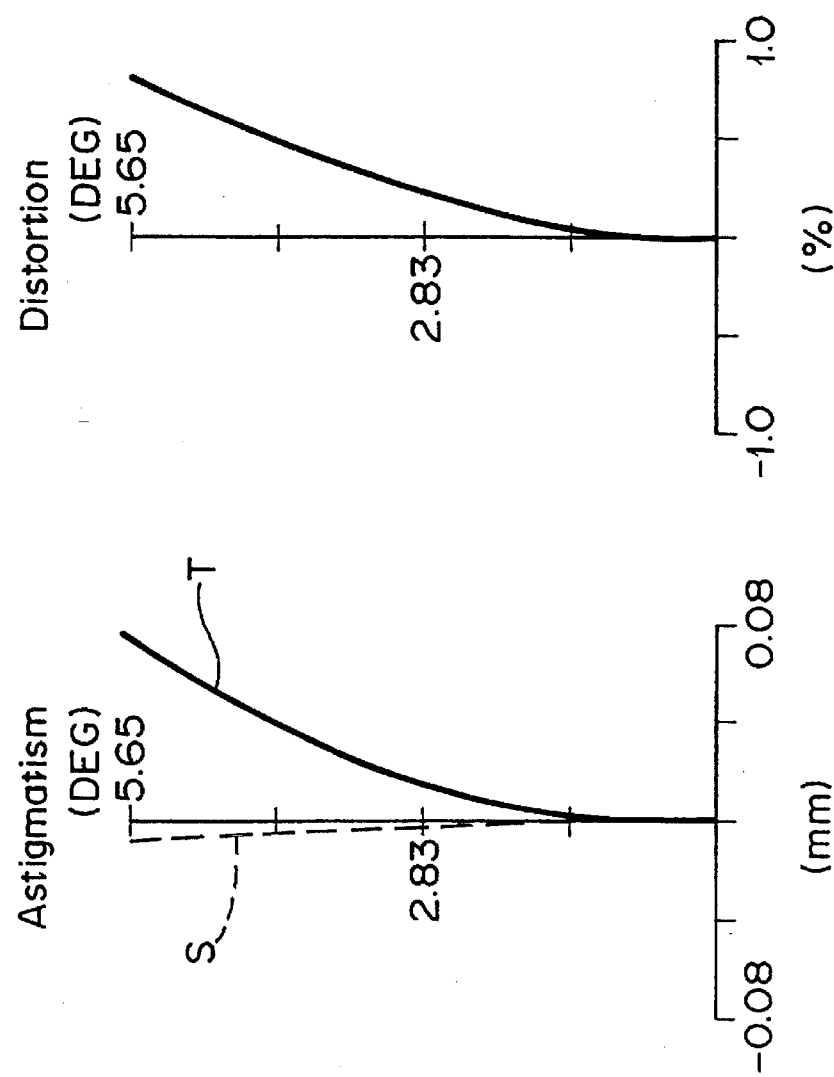
FIGS. 20A, 20B, and 20C are diagrams showing longitudinal aberrations with an intermediate focal length setting of the zoom lens according to the fifth example.
Figure 21C:
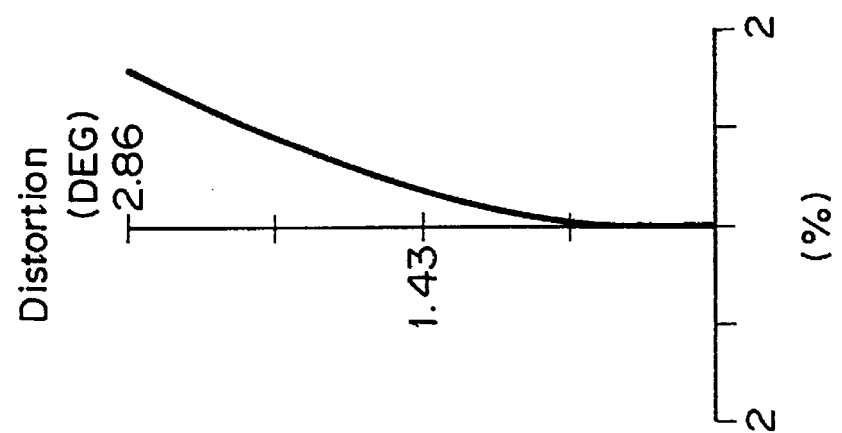
FIGS. 21A, 21B, and 21C are diagrams showing longitudinal aberrations with a telephoto setting of the zoom lens according to the fifth example.
Figure 21B:
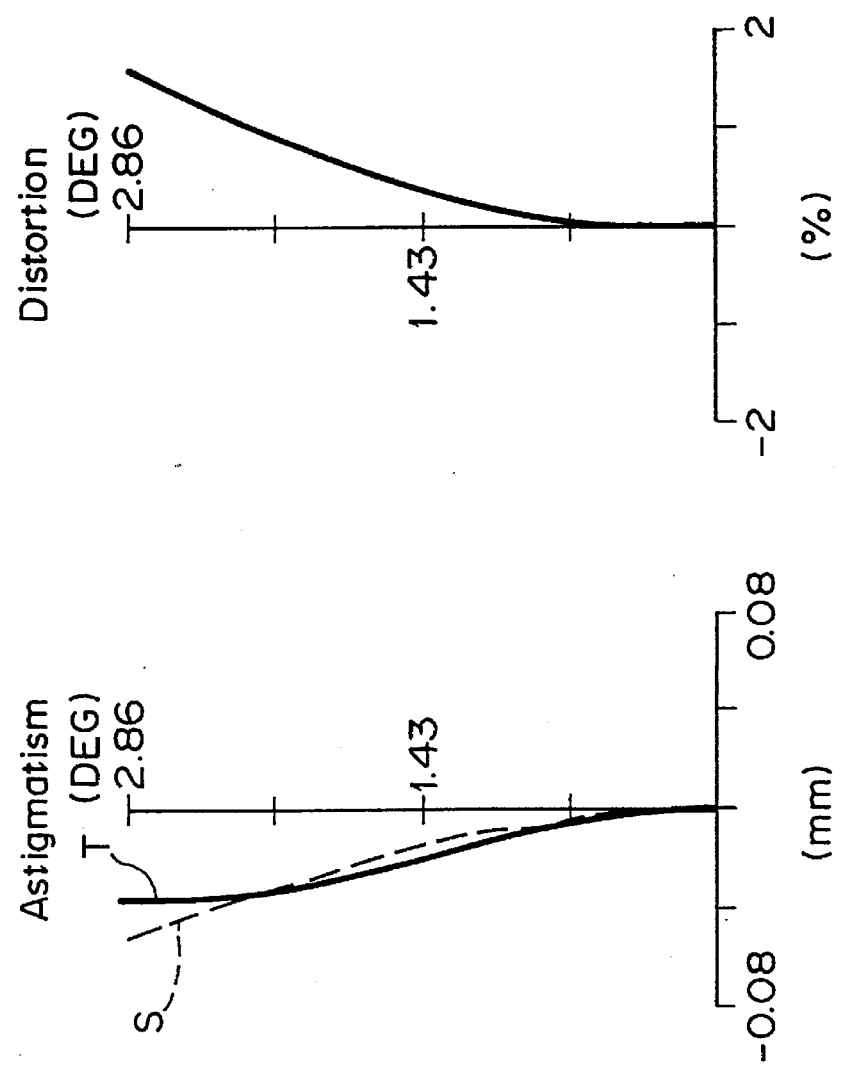
Figure 21A:
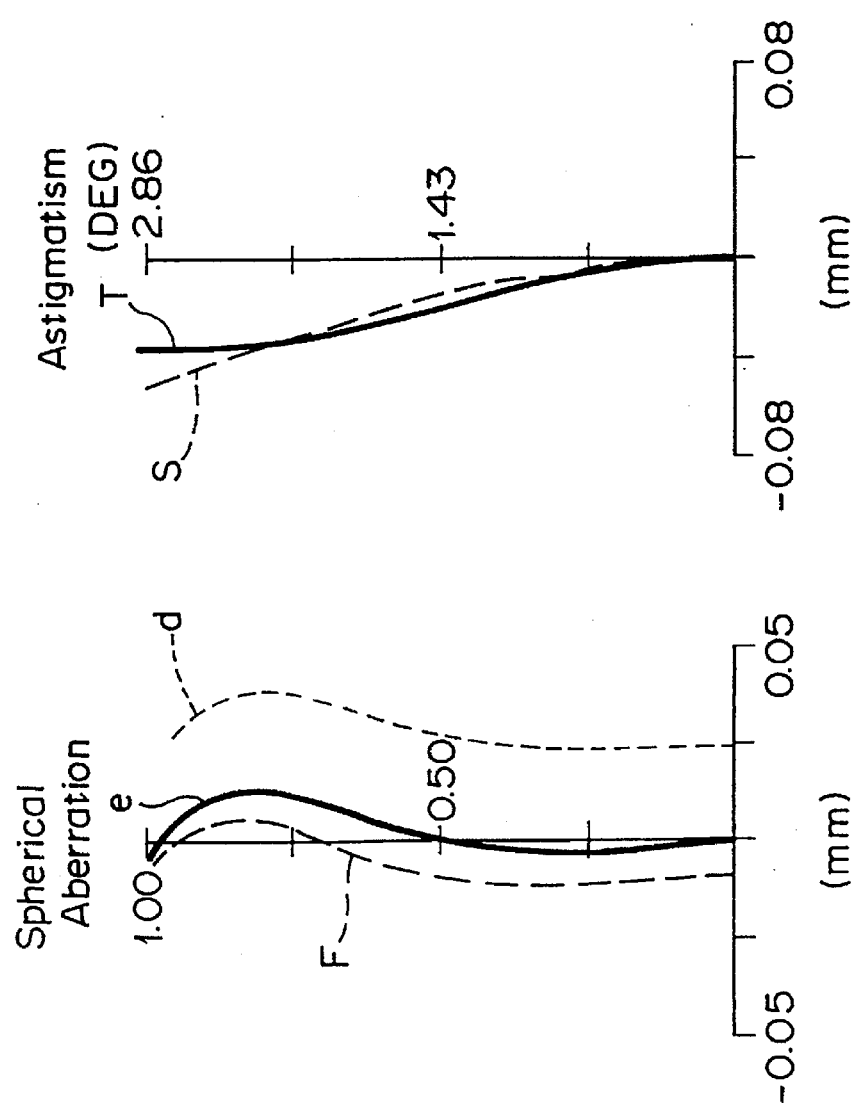

In the zoom lens according to Example 5, the negative-meniscus lens 41 and the positive lens 42 of the fourth lens group 4 are joined to each other, the negative-meniscus lens 41 is made of synthetic resin (specifically, polycarbonate), and the positive lens 42 is made of optical glass. The zoom lens according to Example 5 has an optical arrangement as shown in FIG. 18. FIGS. 19A through 19C, 20A through 20C, and 21A through 21C show longitudinal aberrations of the zoom lens according to Example 5 at the wide-angle setting (f=10.0), the intermediate setting (f =30.3), and the telephoto setting (f=60.0), respectively.

A. Lens data:

| i | Ri | Di | Ni | vi |
|---|---|---|---|---|
| 1 | 7.55 | 1.71 | 1.805 | 25.5 |
| 2 | 9.33 | 6.86 | 1.589 | 61.3 |
| *3 | −168.61 | 1.38 (variable) | | |
| 4 | 6.68 | 1.14 | 1.834 | 37.2 |
| 5 | 1.20 | 3.92 | | |
| 6 | −13.16 | 1.14 | 1.697 | 48.5 |
| 7 | 5.50 | 3.29 | 1.847 | 23.8 |
| 8 | −68.40 | 23.24 (variable) | | |
| 9 | ∞ (diaphragm) | 0.57 | | |
| *10 | 16.28 | 4.29 | 1.589 | 61.3 |
| *11 | −34.23 | 5.38 | | |
| 12 | −41.79 | 1.14 | 1.847 | 23.8 |
| 13 | 7.63 | 8.43 (variable) | | |
| *14 | 18.43 | 1.14 | 1.586 | 31 (PC) |
| 15 | 0.30 | 6.43 | 1.589 | 61.3 |
| *16 | −23.21 | 10.17 (variable) | | |
| 17 | ∞ | 8.29 | 1.517 | 64.2 |
| 18 | ∞ | | | |

B. Aspherical data:

| Surface | K | AD | AE | AF | AG |
|---|---|---|---|---|---|
| 3rd | 0 | $0.398 \times 10^{-5}$ | $-0.146 \times 10^{-8}$ | $-0.113 \times 10^{-10}$ | $0.283 \times 10^{-13}$ |
| 10th | 0 | $0.915 \times 10^{-5}$ | $-0.229 \times 10^{-6}$ | $0.724 \times 10^{-8}$ | $0.185 \times 10^{-9}$ |
| 11th | 0 | $0.649 \times 10^{-4}$ | $-0.589 \times 10^{-7}$ | $0.192 \times 10^{-8}$ | $0.325 \times 10^{-9}$ |
| 14th | 0 | $-0.212 \times 10^{-4}$ | $0.524 \times 10^{-7}$ | $-0.258 \times 10^{-8}$ | $0.732 \times 10^{-10}$ |
| 16th | 0 | $0.680 \times 10^{-4}$ | $-0.104 \times 10^{-7}$ | $-0.230 \times 10^{-8}$ | $0.860 \times 10^{-10}$ |

C. Variable data:

| | f = 10.0 | f = 30.3 | f = 60.0 |
|---|---|---|---|
| D3 | 1.38 | 16.79 | 24.20 |
| D8 | 23.24 | 7.84 | 0.43 |
| D13 | 8.43 | 5.04 | 8.62 |
| D16 | 10.17 | 13.57 | 9.98 |

EXAMPLE 6

Figure 22:
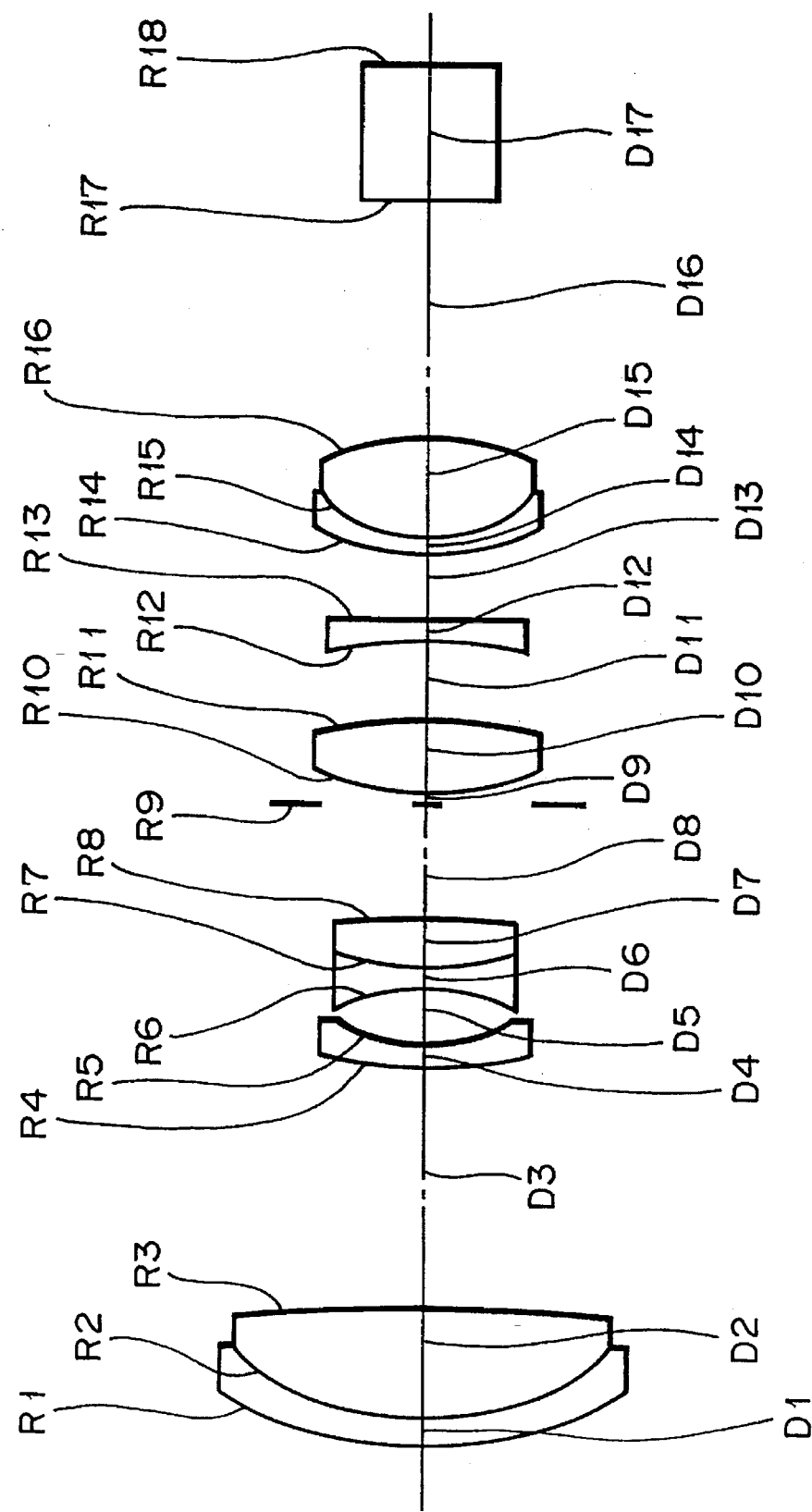
FIG. 22 is a schematic cross-sectional view of a zoom lens according to a sixth example of the present invention.

In the zoom lens according to Example 6, the negative-meniscus lens 41 and the positive lens 42 of the fourth lens group 4 are joined to each other, the negative-meniscus lens 41 is made of optical glass, and the positive lens 42 is made of synthetic resin (specifically, polymethylmethacrylate). The zoom lens according to Example 6 has an optical arrangement as shown in FIG. 22. FIGS. 23A through 23C, 24A through 24C, and 25A through 25C show longitudinal aberrations of the zoom lens according to Example 6 at the wide-angle setting (f=10.0), the intermediate setting (f=30.3), and the telephoto setting (f=60.0), respectively.

A. Lens data:

| i | Ri | Di | Ni | vi |
|---|---|---|---|---|
| 1 | 27.01 | 1.71 | 1.805 | 25.5 |
| 2 | 18.92 | 6.86 | 1.589 | 61.3 |
| *3 | −158.30 | 1.62 | | |

-continued

|  |  | (variable) |  |  |
|---|---|---|---|---|
| 4 | 34.09 | 1.14 | 1.834 | 37.2 |
| 5 | 10.35 | 3.92 |  |  |
| 6 | −12.32 | 1.14 | 1.697 | 48.5 |
| 7 | 13.92 | 3.29 | 1.847 | 23.8 |
| 8 | −89.72 | 22.14 |  |  |
|  |  | (variable) |  |  |
| 9 | ∞ | 0.57 |  |  |
|  | (diaphragm) |  |  |  |
| *10 | 16.78 | 4.29 | 1.589 | 61.3 |
| *11 | −23.46 | 5.66 |  |  |
| 12 | −19.43 | 1.14 | 1.841 | 23.8 |
| 13 | 642.89 | 8.28 |  |  |
|  |  | (variable) |  |  |
| *14 | 13.95 | 1.14 | 1.689 | 31.1 |
| *15 | 9.32 | 6.43 | 1.492 | 57 (PMMA) |
| *16 | −15.55 | 10.91 |  |  |
|  |  | (variable) |  |  |
| 17 | ∞ | 8.29 | 1.517 | 64.2 |
| 18 | ∞ |  |  |  |

B. Aspherical data:

| Surface | K | AD | AE | AF | AG |
|---|---|---|---|---|---|
| 3rd | 0 | $0.441 \times 10^{-5}$ | $-0.220 \times 10^{-8}$ | $-0.925 \times 10^{-11}$ | $0.229 \times 10^{-13}$ |
| 10th | 0 | $0.990 \times 10^{-5}$ | $-0.261 \times 10^{-6}$ | $0.532 \times 10^{-8}$ | $0.192 \times 10^{-9}$ |
| 11th | 0 | $0.547 \times 10^{-4}$ | $-0.656 \times 10^{-7}$ | $0.336 \times 10^{-9}$ | $0.295 \times 10^{-9}$ |
| 14th | 0 | $-0.469 \times 10^{-4}$ | $-0.133 \times 10^{-6}$ | $-0.207 \times 10^{-8}$ | $0.918 \times 10^{-10}$ |
| 15th | 0 | $-0.627 \times 10^{-4}$ | $-0.164 \times 10^{-5}$ | $-0.943 \times 10^{-8}$ | $0.224 \times 10^{-9}$ |
| 16th | 0 | $0.100 \times 10^{-3}$ | $0.216 \times 10^{-6}$ | $-0.255 \times 10^{-8}$ | $0.692 \times 10^{-10}$ |

C. Variable data:

|  | f = 10.0 | f = 30.3 | f = 60.0 |
|---|---|---|---|
| D3 | 1.62 | 16.04 | 23.33 |
| D8 | 22.14 | 7.72 | 0.43 |
| D13 | 8.28 | 4.27 | 7.57 |
| D16 | 10.91 | 14.92 | 11.62 |

Having described preferred embodiments of the invention with reference to the accompanying drawings, it is to be understood that the invention is not limited to these precise embodiments and that various changes and modifications could be effected by one skilled in the art without departing from the spirit or scope of the invention as defined in the appended claims.

What is claimed is:

1. A zoom lens comprising:

a first lens group having a positive refracting power, said first lens group consisting of two lens elements arranged along a common optical axis;

a second lens group having a negative refracting power;

a third lens group having a positive refracting power, said third lens group consisting of two lens elements arranged along said optical axis; and a fourth lens group having a positive refracting power;

said first, second, third, and fourth lens groups being successively arranged along said optical axis in the order named from an object side, said first and third lens groups being fixed in position, said second lens group being movable for varying a magnification, and said fourth lens group being movable for compensating for an image plane movement due to the varied magnification and also for focusing;

wherein said fourth lens group consists of a negative-meniscus lens element having a convex surface directed toward the object side and a positive lens element, said negative-meniscus lens element and said positive lens element being successively arranged along said optical axis in the order named from the object side, and at least one of said negative-meniscus lens element or said positive lens element being made of a synthetic resin.

2. A zoom lens according to claim 1, wherein both of said negative-meniscus lens element and said positive lens element are made of respective synthetic resins, said synthetic resins being defined by a temperature parameter vT having an equation:

$$vT = \left( \frac{\frac{dNd}{dT}}{Nd - 1} - \alpha \right)^{-1}$$

where Nd is a refractive index with respect to the d-lines, dNd/dt is a temperature gradient of the refractive index, and α is a coefficient of linear expansion, the absolute value of the temperature parameter of the material of which said negative-meniscus lens element is made being smaller than the absolute value of the temperature parameter of the material of which said positive lens element is made, whereby the respective materials which comprise said negative-meniscus lens elements and said positive lens elements minimize a temperature-dependent change in a focal length of said fourth lens group.

3. A zoom lens according to claim 1, wherein said negative-meniscus lens element and said positive lens element are separated from each other and are made of polycarbonate and polymethylmethacrylate, respectively.

4. A zoom lens according to claim 1, wherein said negative-meniscus lens element and said positive lens element are separated from each other and are made of polycarbonate and optical glass, respectively.

5. A zoom lens according to claim 1, wherein said negative-meniscus lens element and said positive lens element are separated from each other and are made of optical glass and polymethylmethacrylate, respectively.

6. A zoom lens according to claim 1, wherein said negative-meniscus lens element and said positive lens element are joined to each other and are made of polycarbonate and polymethylmethacrylate, respectively.

7. A zoom lens according to claim 1, wherein said negative-meniscus lens element and said positive lens element are joined to each other and are made of polycarbonate and optical glass, respectively.

8. A zoom lens according to claim 1, wherein said negative-meniscus lens element and said positive lens element are joined to each other and are made of optical glass and polymethylmethacrylate, respectively.

9. A zoom lens according to claim 1, wherein at least one lens element in one of said first, third and fourth lens groups is a spherical lens element.

* * * * *